United States Patent [19]

Cheong et al.

[11] Patent Number: 5,682,634
[45] Date of Patent: Nov. 4, 1997

[54] METHOD AND DEVICE FOR CONTROLLING SPEED OF A WASHING MACHINE MOTOR

[75] Inventors: Dal Ho Cheong; Doo Whan Sang, both of Seoul, Rep. of Korea

[73] Assignee: Goldstar Co., Ltd., Seoul, Rep. of Korea

[21] Appl. No.: 341,049

[22] Filed: Nov. 16, 1994

[30] Foreign Application Priority Data

| Nov. 16, 1993 | [KR] | Rep. of Korea | 24065/1993 |
| Jan. 20, 1994 | [KR] | Rep. of Korea | 1068/1994 |
| Mar. 29, 1994 | [KR] | Rep. of Korea | 6365/1994 |
| May 16, 1994 | [KR] | Rep. of Korea | 10678/1994 |
| May 17, 1994 | [KR] | Rep. of Korea | 10853/1994 |

[51] Int. Cl.$^6$ .................................................. D06F 33/02
[52] U.S. Cl. .............................. 8/159; 68/12.04; 364/161
[58] Field of Search .......................... 68/12.02, 12.09, 68/12.16, 23.5; 364/140, 161, 171, 160, 162, 163; 318/754, 800, 806; 8/159

[56] References Cited

U.S. PATENT DOCUMENTS

| 4,711,104 | 12/1987 | Ikeda | 68/23 |
| 4,959,596 | 9/1990 | MacMinn et al. | 318/254 |
| 4,972,134 | 11/1990 | Getz et al. | 68/12.16 X |
| 5,168,172 | 12/1992 | Jung | 307/119 |
| 5,220,814 | 6/1993 | Imai et al. | 68/12.02 |
| 5,233,847 | 8/1993 | Tanaka | 68/12.04 |
| 5,280,423 | 1/1994 | Imai et al. | 364/140 |
| 5,333,474 | 8/1994 | Imai et al. | 68/12.16 |
| 5,341,452 | 8/1994 | Ensor | 388/811 |
| 5,534,763 | 7/1996 | Williams et al. | 318/799 |

*Primary Examiner*—Reba I. Elmore
*Assistant Examiner*—Brian C. Oakes
*Attorney, Agent, or Firm*—Finnegan, Henderson, Farabow, Garrett & Dunner, L.L.P.

[57] ABSTRACT

This invention relates to a method and apparatus for controlling the speed of a washing machine motor by varying the number of revolutions and changing direction of rotation of the motor to control the water current of the washing machine. The invention detects the actual speed of the washing machine motor at every half cycle of ordinary use power frequency, determines speed error by comparing the detected actual speed with an ordered speed, determines a speed state from the speed error, calculates a proportional integration value according to the determined speed state, and scales the calculated proportional compensation value into an angular value. The washing machine's motor speed is controlled using the scaled angular value.

25 Claims, 18 Drawing Sheets

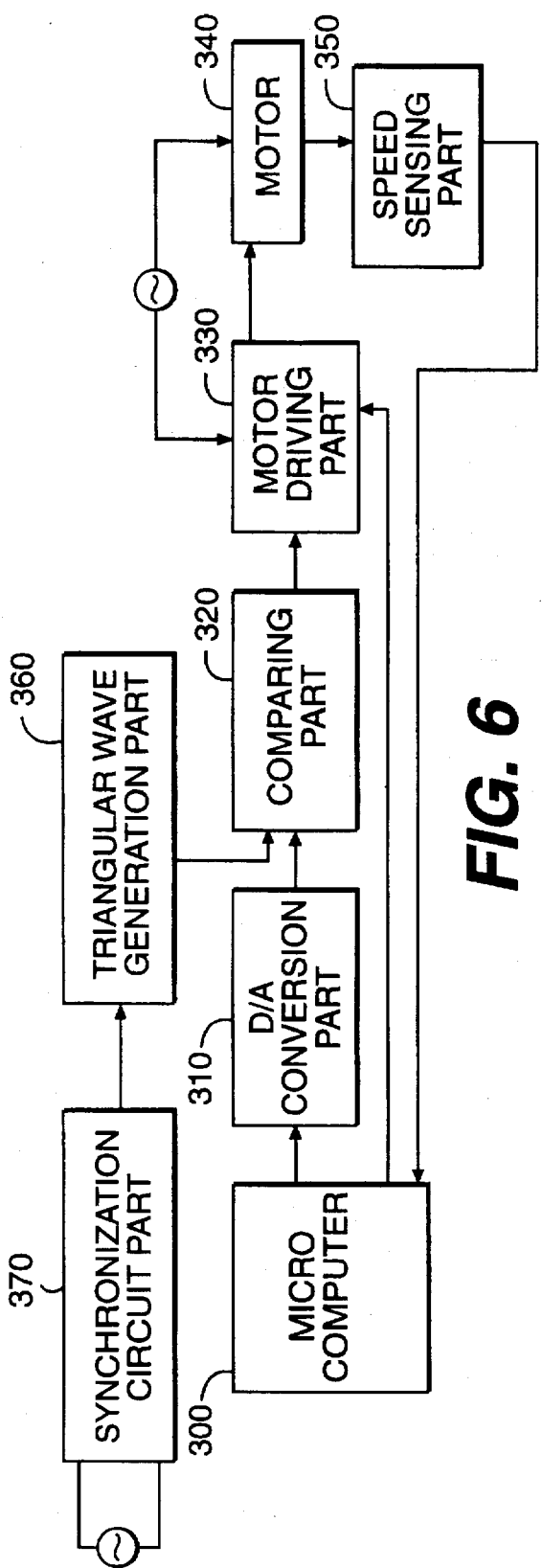
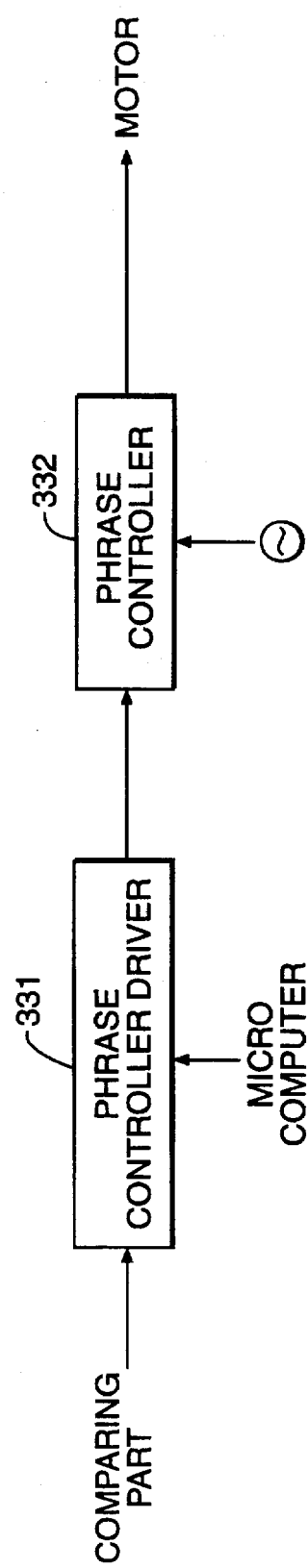
FIG. 6
FIG. 7

METHOD AND DEVICE FOR CONTROLLING SPEED OF A WASHING MACHINE MOTOR

BACKGROUND OF THE INVENTION

The present invention relates to controlling home electric appliances. In particular, this invention relates to methods and devices for controlling the speed of a home electric appliance, i.e., varying the number of revolutions and changing the direction of rotation of the appliance's motor. While the invention is subject to a wide range of applications, it is especially suited for use in a washing machine, and will be particularly described in that connection.

A conventional device for controlling the speed of a washing machine motor is explained hereinafter, referring to a Low Noise Type (G-Series) motor listed in a Matsushita catalogue.

A conventional device for controlling the speed of a washing machine motor (see FIG. 1) includes a tachogenerator 6 for detecting the number of revolutions of a washing machine motor 7, a rectification circuit part 1 for converting signals received from the tachogenerator 6 into direct current by rectifying and smoothing the signals, a variable resistor 8 for setting a speed of rotation, a first comparing part 3 for comparing signals from the rectification circuit part 1 with signals varied by the variable resistor 8, a triangular wave generation part 2 for generating triangular pulse signals, a second comparing part 4 for comparing the triangular pulse signals received from the triangular wave generation part 2 with the signals received from the first comparing part 3, a trigger part 5 for triggering the signals received from the second comparing part 4 to control operation of the washing machine motor 7, and a triac 9 for turning on/off a power supply to the washing machine motor in response to the control signal of the trigger part 5.

Operation of the foregoing conventional device for controlling the speed of a washing machine motor is explained hereinafter.

A tachosignal is generated at the tachogenerator 6, which is a sine wave voltage proportional to the number of revolutions of the washing machine motor 7. The tachosignal is applied to the rectification circuit part 1 and is rectified into a direct current voltage. The direct current voltage from the rectification circuit part 1 is applied to the first comparing part 3 for comparison with a voltage generated by the variable resistor 8, which is used for setting the speed of rotation of the washing machine motor. The output of the first comparing part is then applied to the second comparing part 4 for comparison with the triangular pulse signals generated by the triangular wave generation part 2. The signal output from the second comparing part 4 is applied to the triac 9, through the trigger part 5 for triggering a gate of the triac 9. This signal output from the second comparing part 4, controls the phase of alternating current of the power supplied to the washing machine motor 7, thereby controlling the speed of the washing machine motor 7.

However, the conventional device for controlling the speed of a washing machine motor has the problem of complicated and unstable control because, when reversing the motor 7, the motor 7 should be stopped to change over a switch, provided outside of the motor 7, for changing a winding of the motor 7. Also, the motor 7 has exhibited a great variation in its number of revolutions due to a low precision of rectification part 1 for converting the sine wave signal generated by the tachogenerator 6 into a direct current voltage.

In light of the foregoing, there is a need for controlling a home appliance motor that operates as effectively as conventional devices, but which has simple and stable control.

SUMMARY OF THE INVENTION

The object of this invention is to provide methods and devices for controlling the speed and direction of rotation of a washing machine motor that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the methods and devices particularly pointed out in the written description and claims hereof as well as the appended drawings.

These and other objects and features of this invention can be achieved by providing a method for controlling the speed of a washing machine motor relative to an order speed, the method including steps of detecting actual speed of a washing machine motor at every half cycle of an alternating current power supply frequency, detecting speed error by comparing the detected actual speed with the order speed, determining a condition of speed using the detected speed error, calculating a proportional integration value according to the determined speed condition, scaling the calculated proportional compensation value into an angular value, and controlling the speed of the washing machine motor according to the scaled angular value.

The objects and features of the invention can further be achieved by a device for controlling the speed of a washing machine motor, wherein the washing machine motor is driven by an alternating current power supply, the device including speed detection means for detecting the number of revolutions of the washing machine motor, a microcomputer for generating order signals for controlling the speed of rotation, direction of rotation, and stoppage of the washing machine motor according to the number of revolutions of the washing machine motor, a digital/analog conversion means for converting the order signal controlling the speed of rotation of the washing machine motor into an analog signal, a triangular wave generation means for generating triangular pulses synchronized to a zero crossing point of the alternating current power supply voltage, a comparing means for comparing the analog signal and the triangular pulses and generating trigger pulses according to the result of the comparison, and a motor driving means for feeding alternate current from the power supply to the washing machine motor in response to the order signals for controlling direction of rotation and stoppage of the washing machine motor together with the trigger pulses.

The objects and features of the invention can additionally be achieved by providing a device for controlling the speed of a washing machine motor including a current detection means for detecting current flowing through the washing machine motor, a microcomputer for determining a quantity of laundry according to a speed-torque characteristic curve of the washing machine motor and the detected current, determining the driving speed of the washing machine motor, and controlling operation of the washing machine motor based on the determined quantity of laundry, and a switching means for controlling operation of the washing machine motor under the control of the microcomputer.

The objects and features of the invention can also be achieved by still another device for controlling the speed of a washing machine motor including a speed detection means for detecting the speed of the washing machine motor, a current detection means for detecting current flowing through the washing machine motor, a wave rectification means for rectifying the detected current into a direct current, a microcomputer for controlling the speed of the washing machine motor according to the detected speed and the direct current, and an input power control means for controlling input power to the washing machine motor under the control of the microcomputer.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate several embodiments of the invention and together with the description serve to explain the principles of the invention.

BRIEF DESCRIPTION OF THE DRAWINGS

FIG. 6 is a schematic of first device for controlling the speed of a washing machine motor, in which the present invention is embodied.

FIG. 7 is detailed schematic of the motor driving part of FIG. 6.

DETAILED DESCRIPTION OF THE INVENTION

Methods for controlling the speed of a washing machine motor in accordance with this invention are explained hereinafter with reference to the attached drawings.

Figure 1:
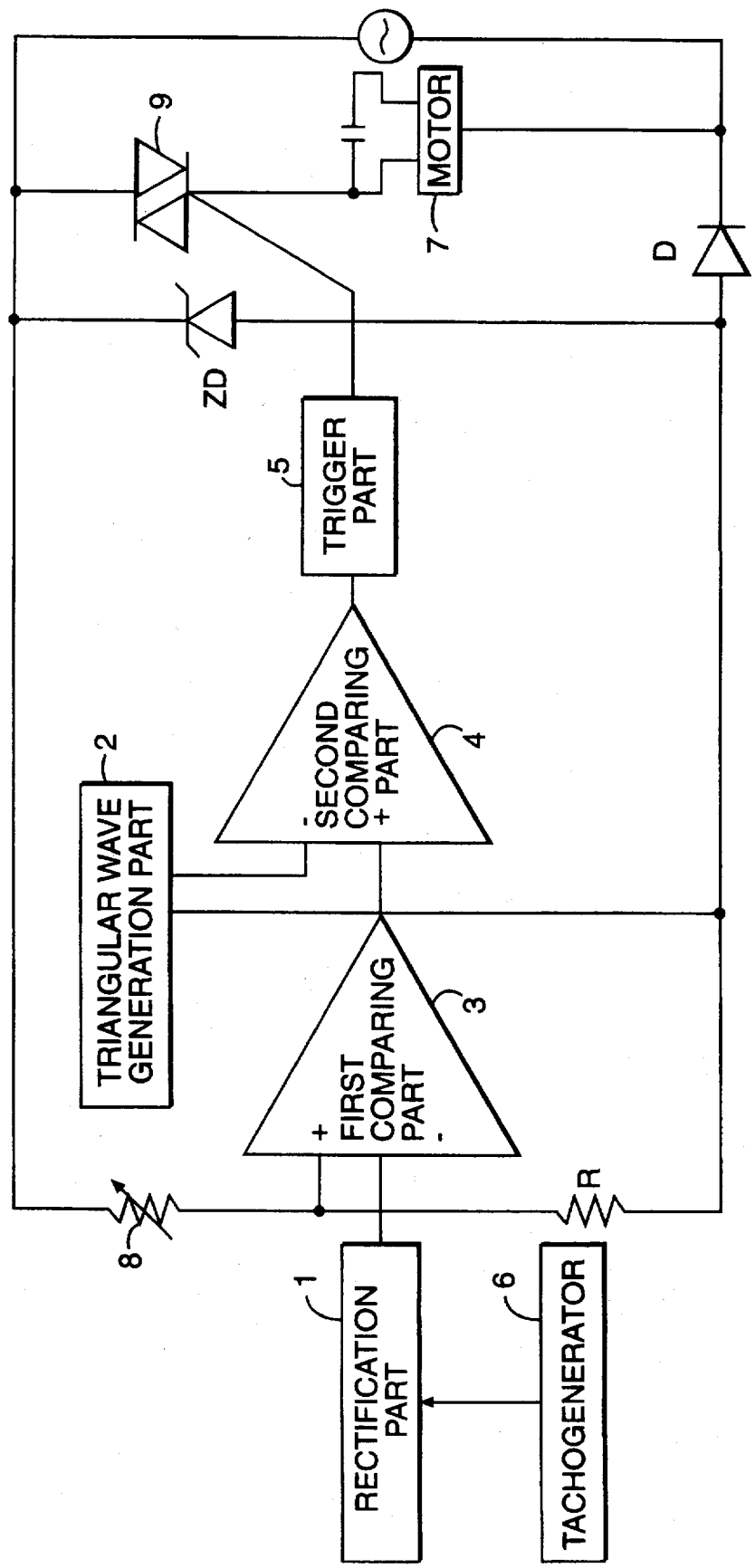
FIG. 1 is a schematic of a conventional device for controlling the speed of a washing machine motor.
Figure 2:
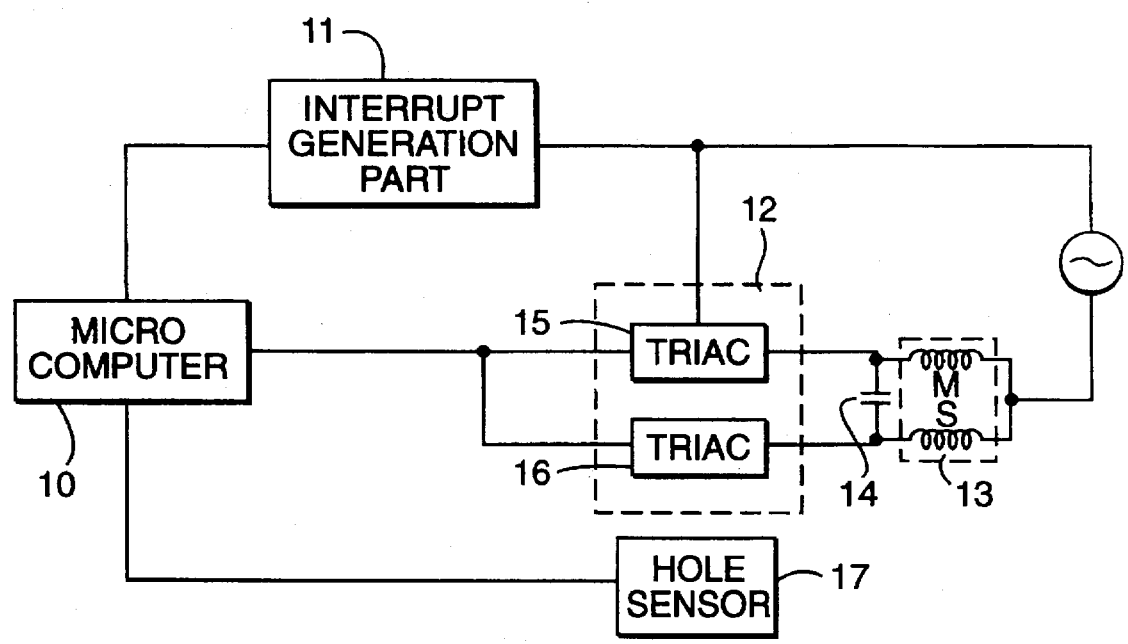
FIG. 2 is a schematic of a device for controlling the speed of a washing machine motor, in which the present invention is embodied.

FIG. 2 shows hardware for carrying out a method for controlling the speed of a washing machine motor in accordance with this invention. As embodied herein and referring to FIG. 2 the hardware includes a hole sensor 17 that detects the rotating frequency of a single phase washing machine motor 13, converts the detected rotating frequency into rectangular pulses, and outputs the rectangular pulses. An interrupt generation part 11 detects cycles of an alternating current power supply frequency and outputs an interrupt signal at every half cycle. A microcomputer 10 calculates speed error, which is a deviation from an order speed, based on the outputs received both from the interrupt generation part 11 and the hole sensor 17, and controls the speed of the washing machine motor 13 by generating and applying an error compensation value based on the calculated speed error. A triac circuit part 12 has two triacs 15 and 16 for controlling the speed of the washing machine motor 13 according to the microcomputer 10. A condensor 14 converts alternating magnetic fields applied to the washing machine motor 13 by the triac circuit part 12 into rotating magnetic fields.

Operation of the foregoing hardware for carrying out the method for controlling speed of the washing machine motor is explained hereinafter.

When the triac 15 is turned on in response to the order speed received from the microcomputer 10, current starts to flow through a main coil M of the washing machine motor 13 and subsequently, lagging current starts to flow through the subcoil S of the washing machine motor 13. The condenser 14 converts the alternating field in the washing machine motor 13 into a rotating field, which causes the washing machine motor 13 to rotate. When the motor 13 rotates, the hole sensor 17 detects a number of revolutions of the washing machine motor 13 and applies rectangular pulses corresponding to the detected number of revolutions to the microcomputer 10.

When power is fed to the washing machine motor 13, the interrupt generation part 11 detects a cycle (16.6 ms) of the alternating current power supply frequency (AC;60 Hz) and generates interrupt signals at every half cycle (8.3 ms) of the detected power supply frequency.

Every time the interrupt signal is generated, the microcomputer 10 detects a falling edge of the rectangular pulse received from the hole sensor 17 and calculates actual speed of the washing machine motor 13 by calculating a period of time from a first falling edge to the next falling edge, i.e., a cycle based on the detected falling edges.

Actual speed (Wrm*) of a washing machine motor can be detected by carrying out the foregoing process repeatedly.

By detecting a speed error, i.e., deviation of the detected actual speed of the washing machine motor 13 from an order speed, the speed of the washing machine motor 13 can be controlled.

The method for controlling the speed of a washing machine motor in accordance with this invention and applicable to the foregoing hardware, is to be explained in detail hereinafter, referring to FIGS. 3, 4, and 5.

Figure 3:
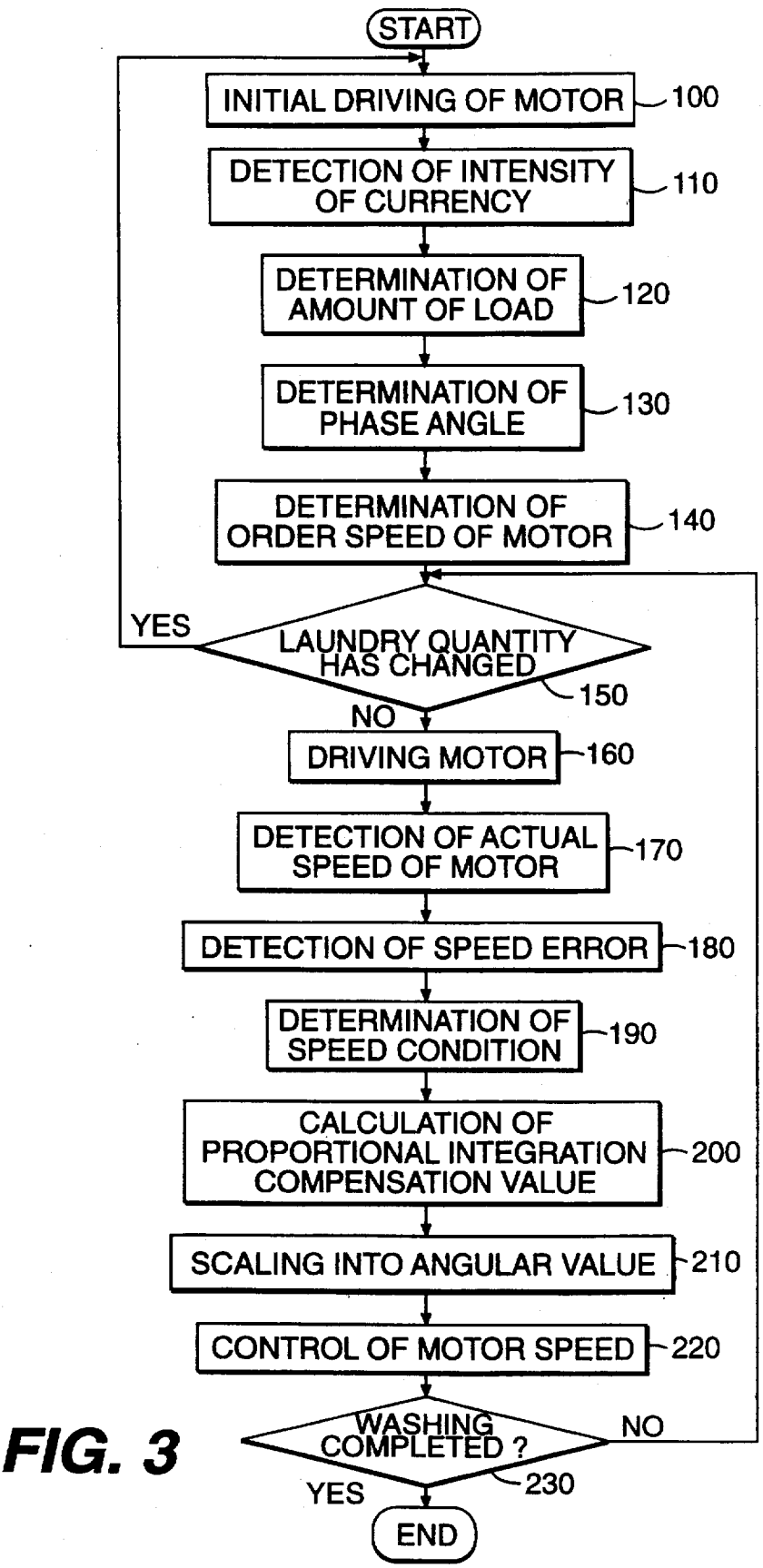
FIG. 3 is a flow chart of a method for controlling the speed of a washing machine motor, applicable to the device shown in FIG. 2.

As shown in FIG. 3, the method includes a step of determining the order speed for the washing machine motor and driving the washing machine motor based on the determined order speed.

The steps of determining the order speed of the washing machine motor includes steps of determining order speed of the washing machine motor according to the quantity of laundry (steps 100 through 140) and a step for detecting a change of laundry quantity (step 150). If a change of laundry quantity occurs, the steps of determining the order speed of the washing machine motor according to the quantity of laundry are carried out again. If the laundry quantity has not changed as determined in the detection step (step 150) the step of driving the washing machine motor at the order speed of the washing machine motor (step 160) is carried out.

The step of determining the order speed of the washing machine motor includes the steps of initial driving of the washing machine motor for a short duration to detect laundry quantity (step 100), detection of intensity of current flowing through the washing machine motor (step 110) while carrying out the initial driving step of the washing machine motor (step 100), determination of amount of load for determining the laundry quantity according to a ratio of the current intensity at 100% load to the detected current intensity and referring to a speed-torque characteristic curve of the washing machine motor (step 120), determination of phase angle of the washing machine motor by applying phase angle pattern based on the determined amount of load (step 130), and determination of the order speed of the washing machine motor based on the determined phase angle (step 140).

After carrying out the steps of determining the order speed of the washing machine motor (steps 100 through 150) and driving the washing machine motor (step 160), the actual speed detection step for detecting actual speed of the washing machine motor at every half cycle of the ordinary use power frequency (step 170) is carried out, which is to be explained hereinafter in reference to FIG. 4.

Figure 4:
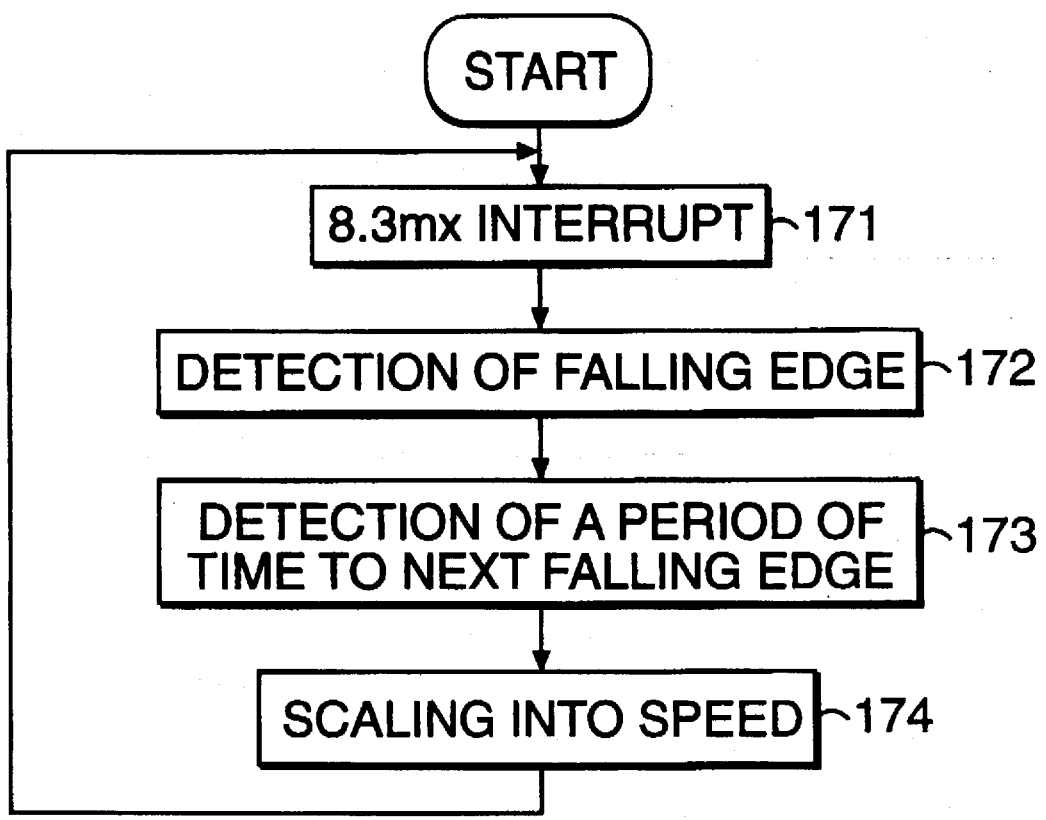
FIG. 4 is a detailed flow chart of the step for detection of actual speed of the motor shown in FIG. 3.

As shown in FIG. 4, the actual speed detection step (step 170) includes an interrupt input step for receiving generated interrupts corresponding to every half cycle of ordinary use power frequency (step 171), a falling edge detection step for detecting falling edges of rectangular pulses corresponding to the rotation of the washing machine motor (step 172), a rectangular pulse cycle detection step for detecting one cycle of the rectangular pulses by detecting a period of time taken from the detected falling edge to the next falling edge (step 173), and scaling speed step for scaling to actual speed of the washing machine motor from the detected cycle of the rectangular pulse (step 174).

Herein, since the cycle of ordinary use alternating current power supply frequency (AC;60 Hz) is 16.6 ms., the interrupt is generated at every 8.3 ms.

After carrying out actual speed detection step (step 170), the speed error detection step is carried out for detecting a speed error by comparing the detected actual speed with the determined order speed, wherein the speed error is a deviation of the actual speed from the order speed (step 180).

After carrying out the speed error detection step (step 180, the speed condition determination step is carried out for determining a condition of the speed based on the detected speed error (step 190). If the speed error is greater than a preset allowance, it is determined to be overspeed; if the speed error ms smaller than the allowance, it is determined to be underspeed; and if the speed error is within the allowance, it is determined to be normal.

After carrying out the speed condition determination step (step 190), the proportional integration compensation value calculation step is carried out for calculating a proportional integration compensation value according to the speed condition (step 200).

Figure 5:
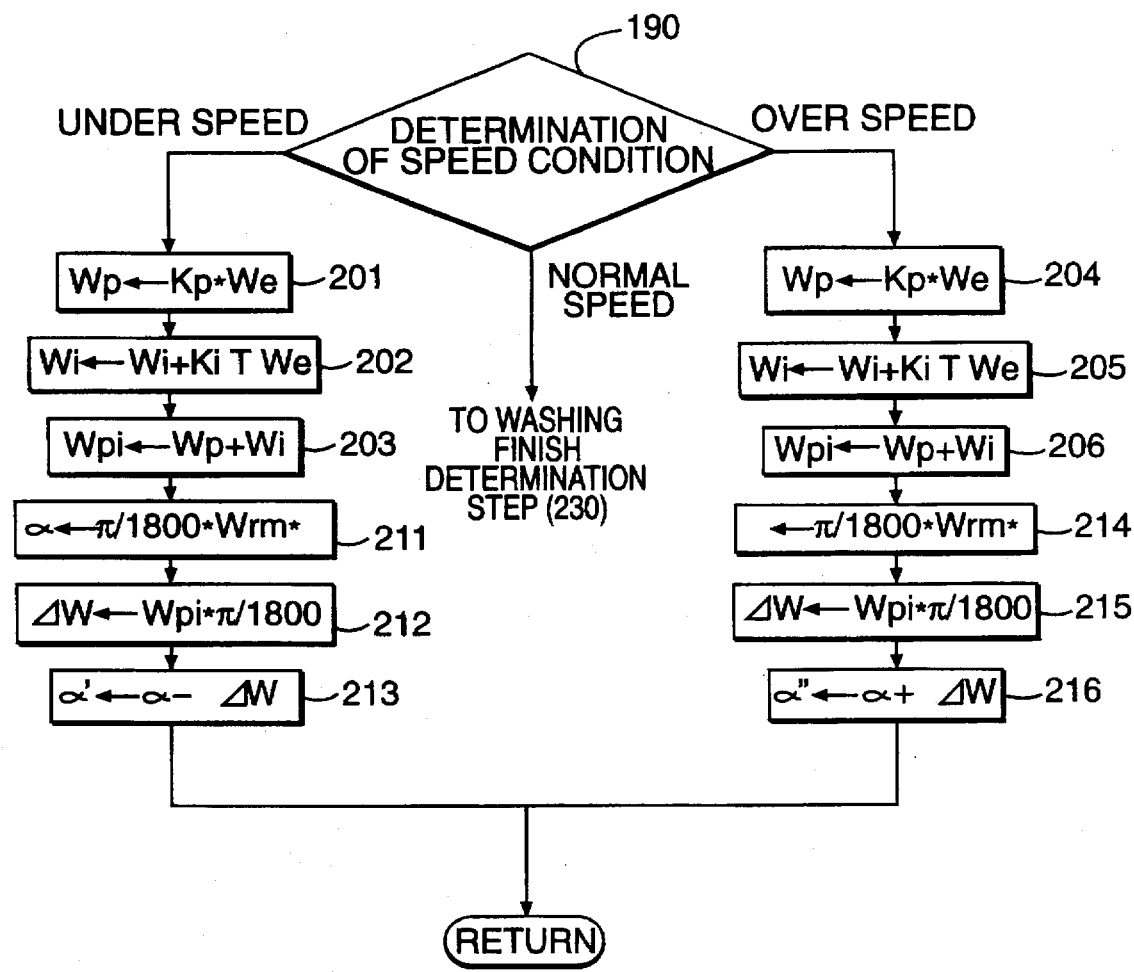
FIG. 5 is a detailed flow chart of the steps for the calculation of a proportional integration compensation value and scaling into angular value shown in FIG. 3.

The proportional integration compensation value calculation step (step 200) includes, as shown in FIG. 5, an underspeed proportional integration compensation value calculation step for calculating an underspeed proportional integration compensation value (steps 201 through 203) if it is found to be underspeed as the result of the speed condition determination step (step 190); and an overspeed proportional integration compensation value calculation step for calculating an overspeed proportional integration compensation value (steps 204 through 206) if it is found to be overspeed as the result of the speed condition determination step (step 190), which is to be explained hereinafter in detail.

The underspeed proportional integration compensation value calculation step includes calculation of a proportional compensation value Wp by multiplying a proportional gain constant Kp and the detected speed error We (step 201), calculation of an integration compensation value Wi by multiplying an integration gain constant Ki, a loop time T, and the speed error We and adding the above multiplied value to an initial integration value Wi (step 202), and calculation of a proportional integration compensation value Wpi by adding the calculated proportional compensation value Wp to the calculated integration compensation value Wi (step 203).

The overspeed proportional integration compensation value calculation step is carried out in a way similar to the underspeed proportional integration compensation value calculation step. That is, the overspeed proportional integration compensation value calculation step includes calculation of a proportional compensation value Wp by multiplying a proportional gain constant Kp and the detected speed error We (step 204), calculation of an integration compensation value Wi by multiplying an integration gain constant Ki, a loop time T, and the speed error We and adding the above multiplied value to an initial integration value Wi (step 205), and calculation of a proportional integration compensation value Wpi by adding the calculated proportional compensation value Wp to the calculated integration compensation value Wi (step 206).

Herein, the initial integration value Wi is "0", and the value thereafter is an accumulation therefrom.

After carrying out the proportional integration compensation value calculation step (step 200), an angular value scaling step is carried out for scaling the calculated proportional integration compensation value into an angular value (step 210).

As shown in FIG. 5, the angular value scaling step (step 210) includes an underspeed angular value calculation step for scaling the underspeed proportional integration compensation value into an angular value (steps 211 through 213) after carrying out the underspeed proportional integration compensation value calculation step (steps 201 through 203), and an overspeed angular value calculation step for scaling the calculated overspeed proportional integration compensation value into an angular value (steps 214 through 216) after carrying out the overspeed proportional integration compensation value calculation step (steps 204 through 206), which is explained hereinafter in detail.

The underspeed angular value calculation step includes scaling the actual speed Wrm* into a first angular value α by multiplying the actual speed Wrm* and π/1800 (step 211), scaling the underspeed proportional integration compensation value Wpi into a second angular value ΔW by multiplying the underspeed proportional integration compensation value Wpi and π/1800 (step 212), and calculating an underspeed angular value α' by subtracting the second angular value ΔW from the first angular value α (step 213).

The overspeed angular value calculation step includes scaling the actual speed Wrm* into a first angular value α by multiplying the actual speed Wrm* and π/1800 (step 214), scaling the overspeed proportional integration compensation value Wpi into a second angular value ΔW by multiplying the overspeed proportional integration compensation value Wpi and π/1800 (step 215), and calculating an overspeed angular value α" by adding the first angular value α and the second angular value ΔW (step 216).

If the underspeed angular value α' is smaller than 0 or greater than π and the overspeed angular value α" is smaller than 0 or greater than π, the speed is normal and the process proceeds to the step for determining whether washing is completed (step 230), which is explained hereinafter.

After carrying out angular value scaling step (step 210), a speed control step of the washing machine motor is carried out for controlling the speed of the washing machine motor (step 220). That is, since the washing machine motor is turned on at angular value "0", and stopped at angular value π after turning 180 degrees, control of the washing machine motor using the angular value is possible.

After finishing the speed control step of the washing machine motor (step 220), and if the step for determining whether washing is finished (step 230) determines that the washing has not been completed, the process returns to the laundry quantity change detection step (step 150). If the step for determining whether washing is finished (step 230) determines that the washing has been completed, the process ends.

Reference will now be made in detail to the present preferred embodiments of the invention, examples of which are illustrated in the accompanying drawing.

As shown in FIG. 6, a device for controlling the speed of a washing machine motor 340 in accordance with a first embodiment of this invention includes a microcomputer 300, a D/A conversion part 310, a comparing part 320, a motor driving part 330, a speed sensing part 350, a triangular wave generation part 360 and a synchronization circuit part 370.

The speed sensing part 350 senses a number of revolutions of the washing machine motor 340 and applies it to the microcomputer 300. The microcomputer 300 generates order signals for controlling the speed of rotation, direction of rotation, and stoppage of the washing machine motor 340 according to the number of revolutions of the washing machine motor received from the speed sensing part 350. The D/A conversion part 310 converts the order signals for controlling the number of revolutions of the washing machine motor 340 received from the microcomputer 300 into analog signals, and the triangular wave generation part 360, synchronizing to the zero crossing point of alternate current voltage, generates triangular pulses.

The comparing part 320 compares signals received from the D/A conversion part 310 and the triangular wave generation part 360 and generates trigger pulses. The motor driving part 330 feeds alternate current to the washing machine motor 340 for driving the washing machine motor 340 in response to the order signals for controlling direction of rotation and stoppage of the washing machine motor 340 received from the microcomputer 300 and signals received from the comparing part 320.

The synchronization circuit part 370 generates synchronizing signals for synchronizing to zero crossing point of an alternate current voltage applied to the washing machine motor 340 and applies the synchronizing signals to the triangular wave generation part 360.

Details of the device for controlling speed of the washing machine motor in accordance with the first embodiment of this invention is described hereinafter.

As shown in FIG. 7, the motor driving part 330 includes a phase controller 332 for controlling a phase of the alternate current of the washing machine motor 340, and a phase controller driver 331 for driving and controlling the phase controller 332 in response to the order signals for controlling direction of rotation and stoppage of the washing machine motor 340 received from the microcomputer 300 and trigger pulses received from the comparing part 320.

Figure 8:
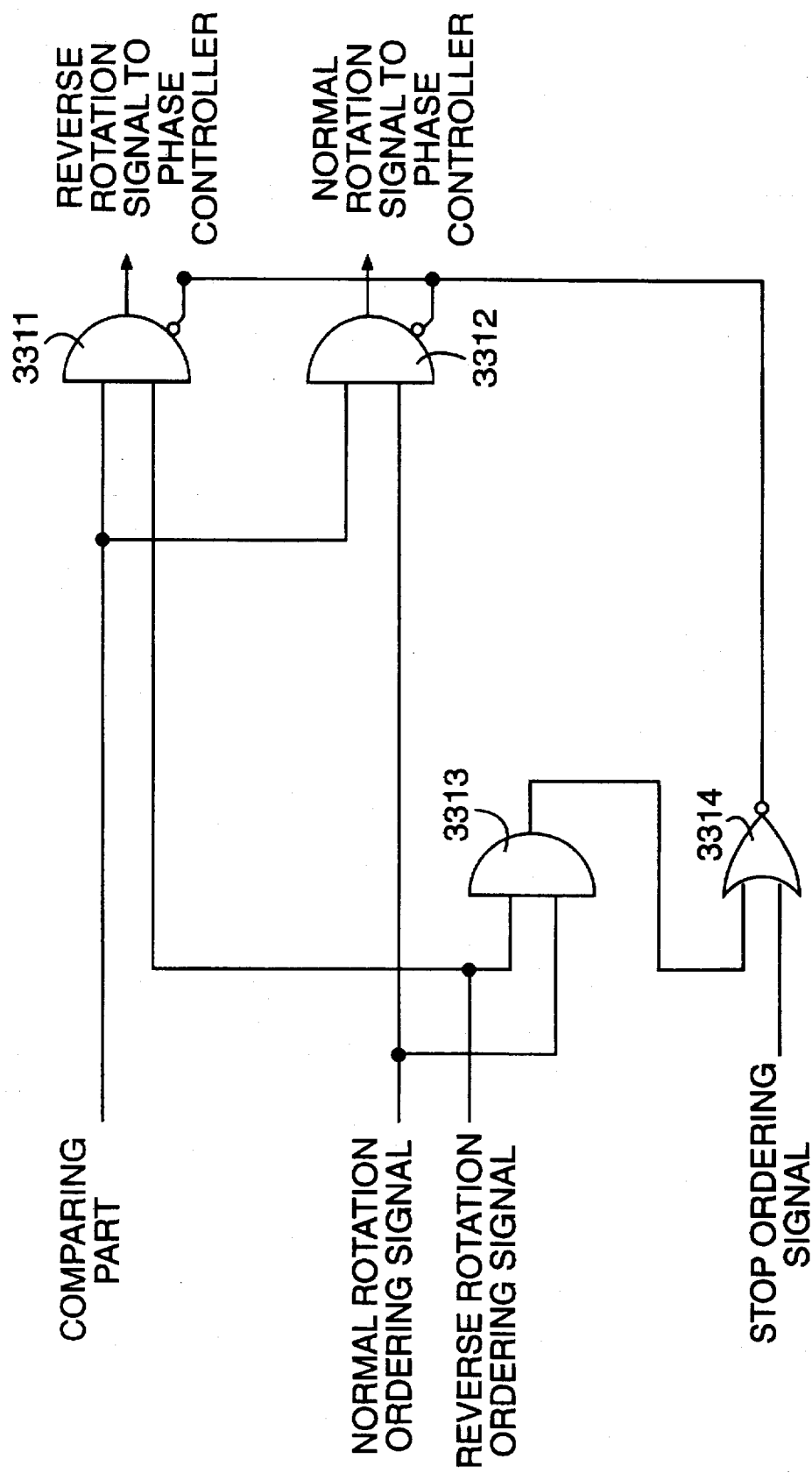
FIG. 8 is detailed circuit diagram of the phase controller driver of FIG. 7.

As shown in FIG. 8, the phase controller driver 331 includes a first AND gate 3311 for logic multiplying the trigger pulse received from the comparing part 320 and the reverse rotation order signal received from the microcomputer 300 for generating reverse rotation signal for the phase controller 332. A second AND gate 3312 logic multiplies the trigger pulse received from the comparing part 320 and the normal rotation order signal received from the microcomputer 300 for generating normal rotation signal for the phase controller 332. A third AND gate 3313 logic multiplies the reverse rotation order signal and the normal rotation order signal received from the microcomputer 300. A NOR gate 3314 performs a NOR operation of the stop order signal received from the third AND gate 3313 and the microcomputer 300 for generating an enable signal controlling operation of the first and the second AND gates 3311 and 3312.

Figure 9:
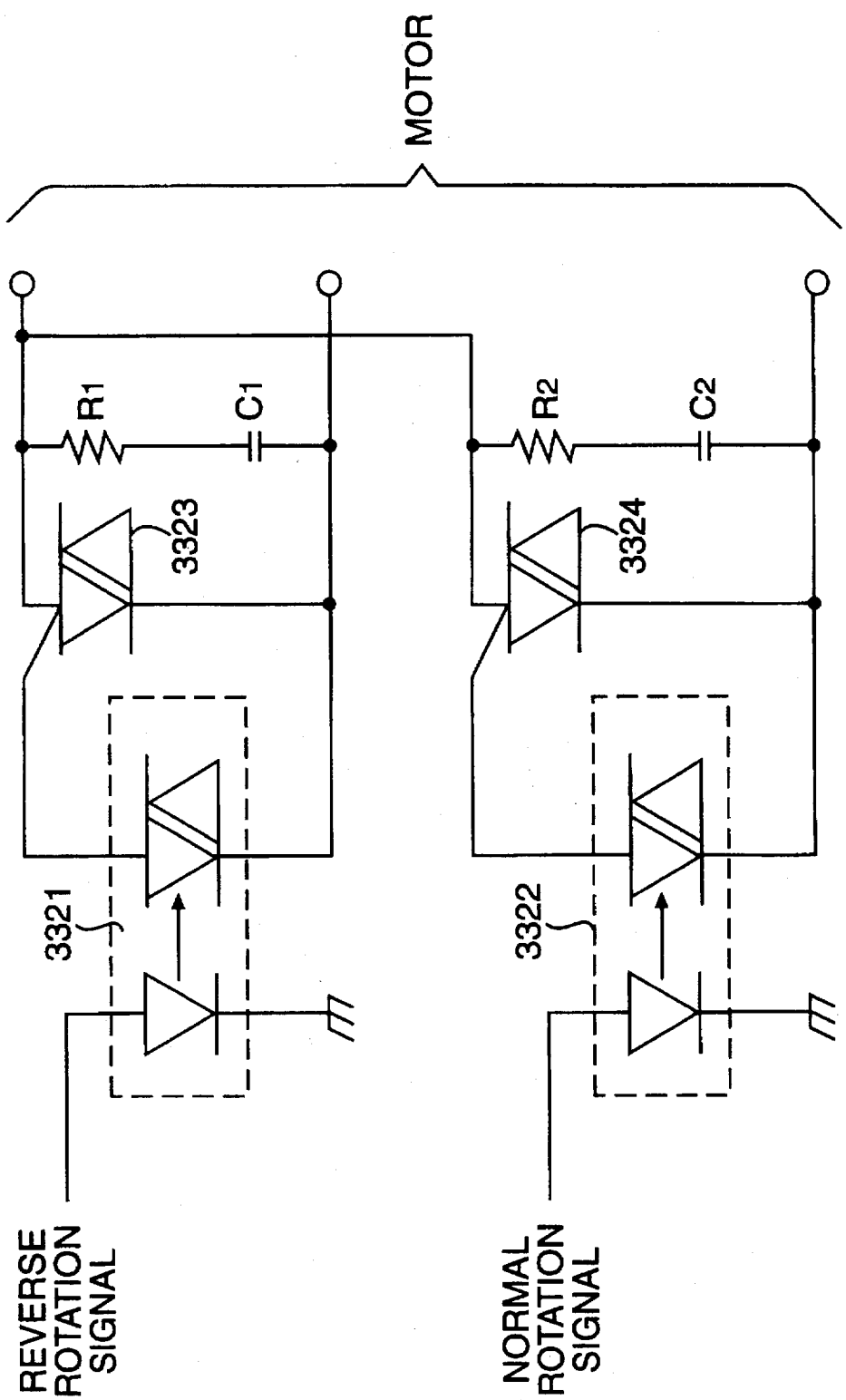
FIG. 9 is detailed circuit diagram of the phase controller of FIG. 7.

As shown in FIG. 9, the phase controller 332 includes a first photocoupler 3321 for separating the reverse rotation signal into alternate current and control signals and for transmitting them. A second photocoupler 3322 separates the normal rotation signal into alternate current and control signals and transmitting them. A first triac 3323 applies alternate current to the washing machine motor 340 in response to the signal received from the first photocoupler 3321. A resistor R1 and a capacitor C1 is connected in series to both ends of the first triac 3323. A second triac 3324 applies alternate current to the washing machine motor 340 in response to the signal received from the second photocoupler 3322. A resistor R2 and a capacitor C2 is connected in series to both ends of the second triac 3324.

Figure 10:
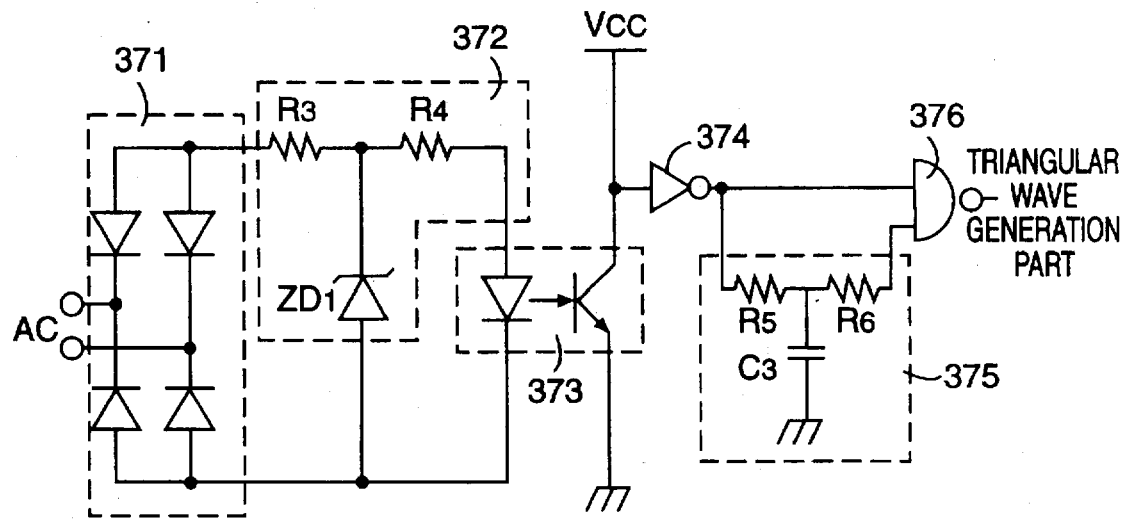
FIG. 10 is detailed circuit diagram of the synchronization circuit part of FIG. 6.

As shown in FIG. 10, the synchronization circuit part 370 includes a rectification part 371 having bridge diodes for rectifying alternate current applied thereto. A clamping part 372 has resistors R3 and R4 connected in series to the rectification part 371 and a zener diode ZD1 with a cathode thereon connected in parallel to the resistors R3 and R4 and an anode thereon connected to the other end of the rectification part 371 for clamping the rectified voltage received from the rectification part 371. A photocoupler 373 separates the signal received from the clamping part 371 into alternate current and control signals and inverts the separated control signal. A NOT gate 374 inverts the signal received from the photocoupler 373. A delay part 375 has resistors R5 and R6 connected in series to the NOT gate 374 and a capacitor C3 with one end thereon connected in parallel to the resistors R5 and R6, and the other end thereon grounded for delaying the signal received from the NOT gate 374. A NAND gate 376 performs a NAND operation of the signals received from the NOT gate 374 and the delay part 375.

Figure 11:
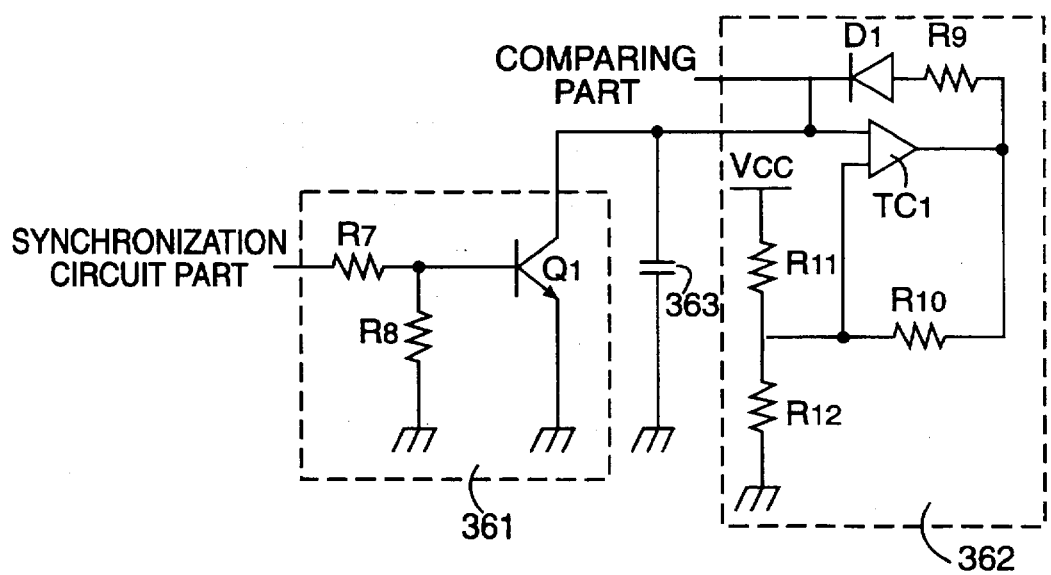
FIG. 11 is detailed circuit diagram of the triangular wave generation part of FIG. 6.

As shown in FIG. 11, the triangular wave generation part 360 includes a capacitor 363 for generating triangular pulses by charging and discharging. A discharge part 361 has a transistor Q1 with a collector thereon connected to the capacitor 363 for discharging the capacitor 363 in response to the synchronization signals received from the synchronization part 370. A charge part 362 has a diode D1 with a cathode thereon connected to an input terminal of the comparing part 320 and a differential amplifier IC1 having input terminals thereon connected to the cathode of the diode D1 and coupled to a power source Vcc, respectively, and an output terminal thereon coupled to the anode of the diode D1 for charging the capacitor 363 depending on the voltage of the power source Vcc.

Operation of the device for controlling speed of a washing machine motor in accordance with the first embodiment of this invention is to be explained hereinafter, referring to FIGS. 12(a) to 12(e) and 13(a) to 13(f).

Figure 12A:
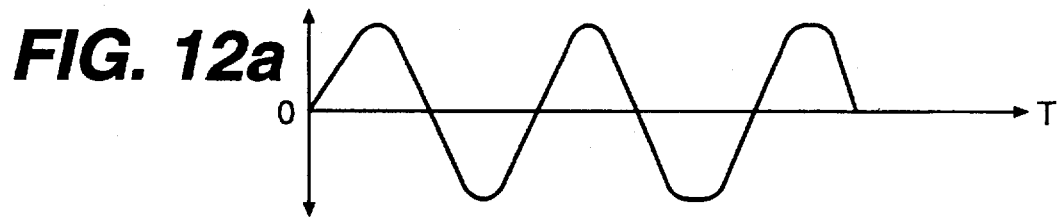
FIGS. 12(a), 12(b), 12(c), 12(d) 12(e) and 13(a), 13(b), 13(c), 13(d), 13(e) 13(f) show signal wave patterns at various parts of FIG. 10–11.
Figure 12B:
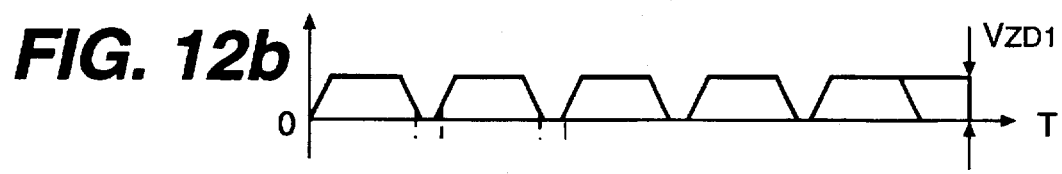
Figure 12C:
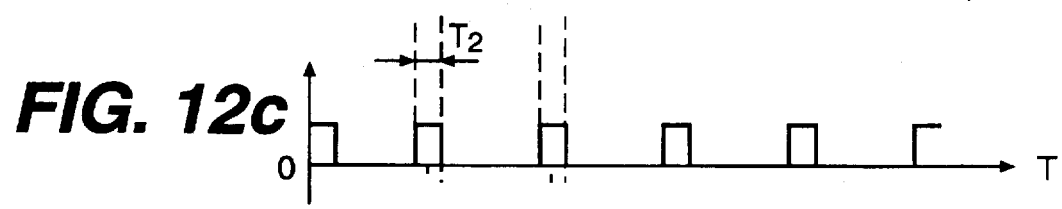

When the voltage of the alternate current power supply applied to the washing machine motor 340 varies as shown in FIG. 12(a), the voltage rectified and clamped by the rectification part 371 and the clamping part 372 of the synchronization part 370 is as shown in FIG. 12(b). The rectified and clamped voltage inverted through the photocoupler 373 varies as shown in FIG. 12(c). The signal wave pattern received from the delay part 375 and the NAND gate 376 and synchronized to the zero crossing point of the alternate current is as shown in FIG. 12(d).

Figure 12D:
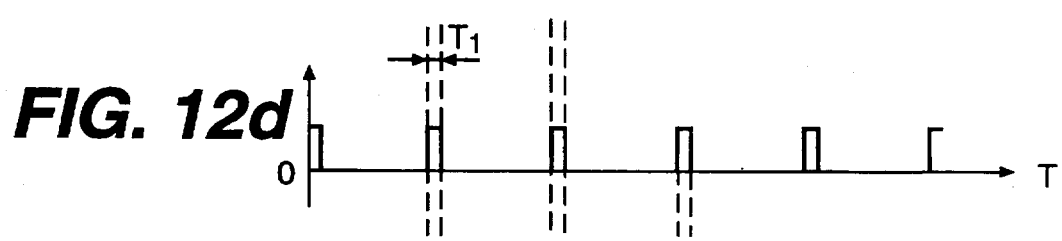
Figure 12E:
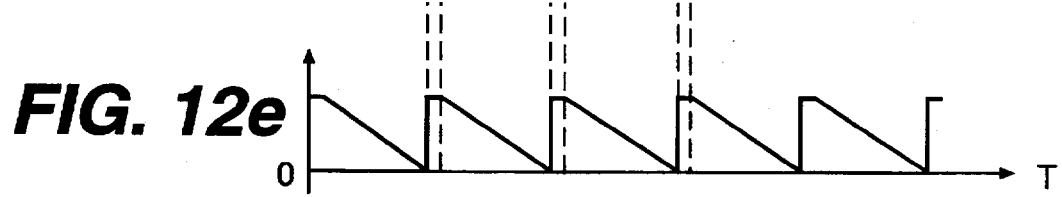

The signal received from the synchronization circuit part 370 (FIG. 12(d)) is converted into triangular pulses by the triangular wave generation part 360 as shown in FIG. 12(e).

On the other hand, the speed sensing part 350 senses the speed of the washing machine motor 340 and applies the sensed speed to the microcomputer 300. The microcomputer 300 issues orders for the number of revolutions and the direction of rotation for controlling the washing machine motor 340. The order signal for controlling the number of revolutions of the washing machine motor 340 received from the microcomputer 300 is, converted into a digital signal by the D/A conversion part 310 and applied to an input terminal of the comparing part 320.

Figure 13A:
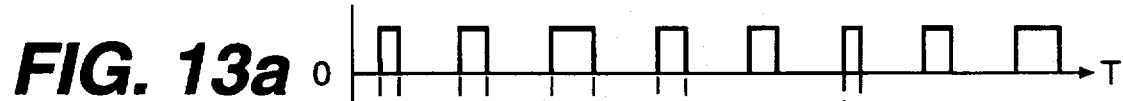
Figure 13B:
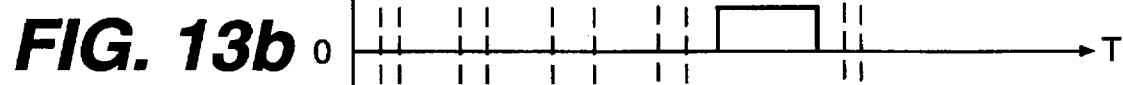

The comparing part 320 compares the triangular pulses (FIG. 12(e)) received from the triangular wave generation part 360 with the signal received from the D/A conversion part 310 to generate trigger pulses as shown in FIG. 13(a).

The trigger pulses (FIG. 13(a)) received from the comparing part 320 together with the order signals for stop, normal rotation and reverse rotation received from the microcomputer 300 are processed by the phase controller driver 331 to generate signals controlling the phase controller 332.

Figure 13C:
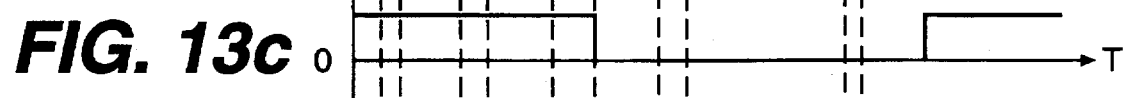
Figure 13D:
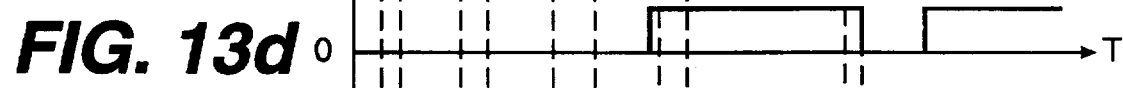
Figure 13E:
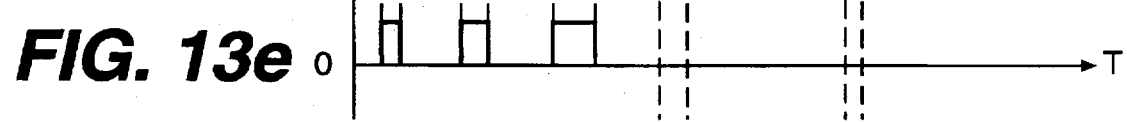
Figure 13F:

That is, when the trigger pulse (FIG. 13(a)) received from the comparing part 320 and the normal rotation order signal (FIG. 13(c)) received from the microcomputer 300 are a high level at the same time, the normal rotation order signal as shown in FIG. 13(e) is applied to the phase controller 332. Only when the trigger pulse (FIG. 13(a)) received from the comparing part 320 and the reverse rotation order signal (FIG. 13(d)) received from the microcomputer 300 are at high level at the same time, the reverse rotation order signal as shown in FIG. 13(f) is applied to the phase controller 332. When either the stop order signal (FIG. 13(b)) is received from the microcomputer 300 or the normal rotation order signal together with the reverse rotation order signal are received at the same time, neither normal rotation signal nor reverse rotation signal are issued either from the third AND gate 3313 or from the NOR gate 3314.

As has been explained, the water current can be controlled at will since, when the phase controller driver 331 generates a reverse rotation signal or a normal rotation signal, the first photocoupler 3321 or the second photocoupler 3322 of the phase controller 332 makes the first triac 3321 or the second triac 3322 conductive to rotate the washing machine motor 340 in reverse or normal direction. Further, the speed can vary according to the level of the order signal issued from the microcomputer 300.

Figure 14:
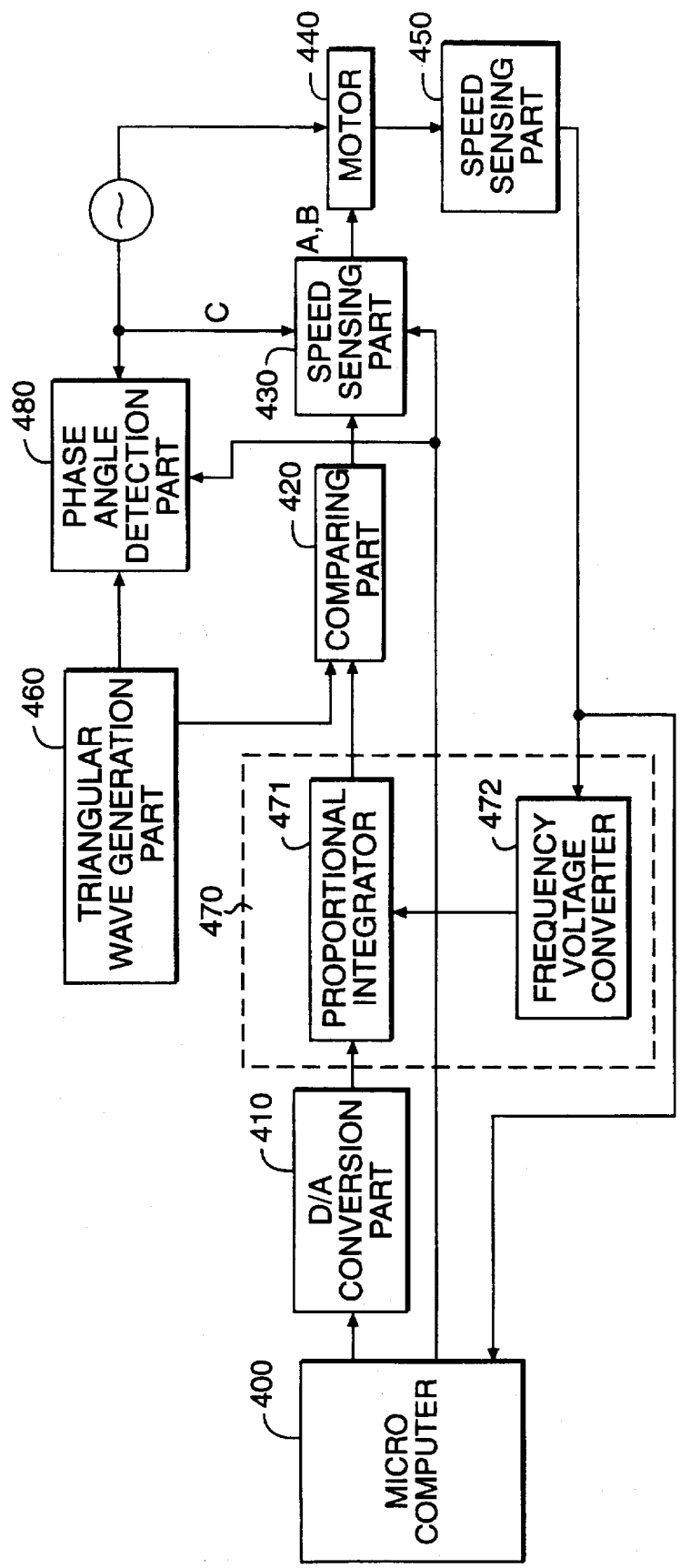
FIG. 14 is a schematic of a second device for controlling the speed of a washing machine motor, in which the present invention is embodied.

As shown in FIG. 14, a device for controlling the speed of a washing machine motor in accordance with a second embodiment of this invention includes a microcomputer 400, a D/A conversion part 410, a proportional integration part 470, a comparing part 420, a triangular wave generation part 460, a phase angle detection part 480, a motor driving part 430, and a speed sensing part 450.

The phase angle detection part 480 detects a phase angle using the alternate current fed from the motor driving part 430 to the washing machine motor 440 and the order signal controlling the direction of rotation of the washing machine motor 440 received from the microcomputer 400, and applies the detected phase angle to the triangular wave generation part 460 to generate triangular pulses according to the detected phase angle.

The proportional integration part 470 includes a frequency/voltage converter 472 for converting the number of revolutions of the washing machine motor 440 received from the speed sensing part 450 into voltage. A proportional integrator 471 for proportional integration of the signal received from the frequency/voltage converter 472 and the signal received from the D/A conversion part 410 to generate a speed error signal. The speed error signals are calculated through proportional integration based on the number of revolutions of the washing machine motor 440 received from the speed sensing part 450 and the signal received from the D/A conversion part 410. The speed error signals are applied to the comparing part 420.

The comparing part 420 compares the signals received from the proportional integration part 470 and the triangular wave generation part 460 to generate trigger pulses. The triangular wave generation part 460 generates triangular pulses according to the phase angle received from the phase angle detection part 480.

The microcomputer 400, the D/A conversion part 410, the motor driving part 430, and the speed sensing part 450 serves similar purpose as the corresponding devices for controlling the speed of a washing machine motor in accordance with the first embodiment of the invention.

Herein, the speed sensing part 450, for example, consisting of the hole sensors variety, senses the number of revolutions and direction of rotation of the washing machine motor 440 and applies them to the microcomputer 400 to control speed of the washing machine motor 400.

Figure 15:
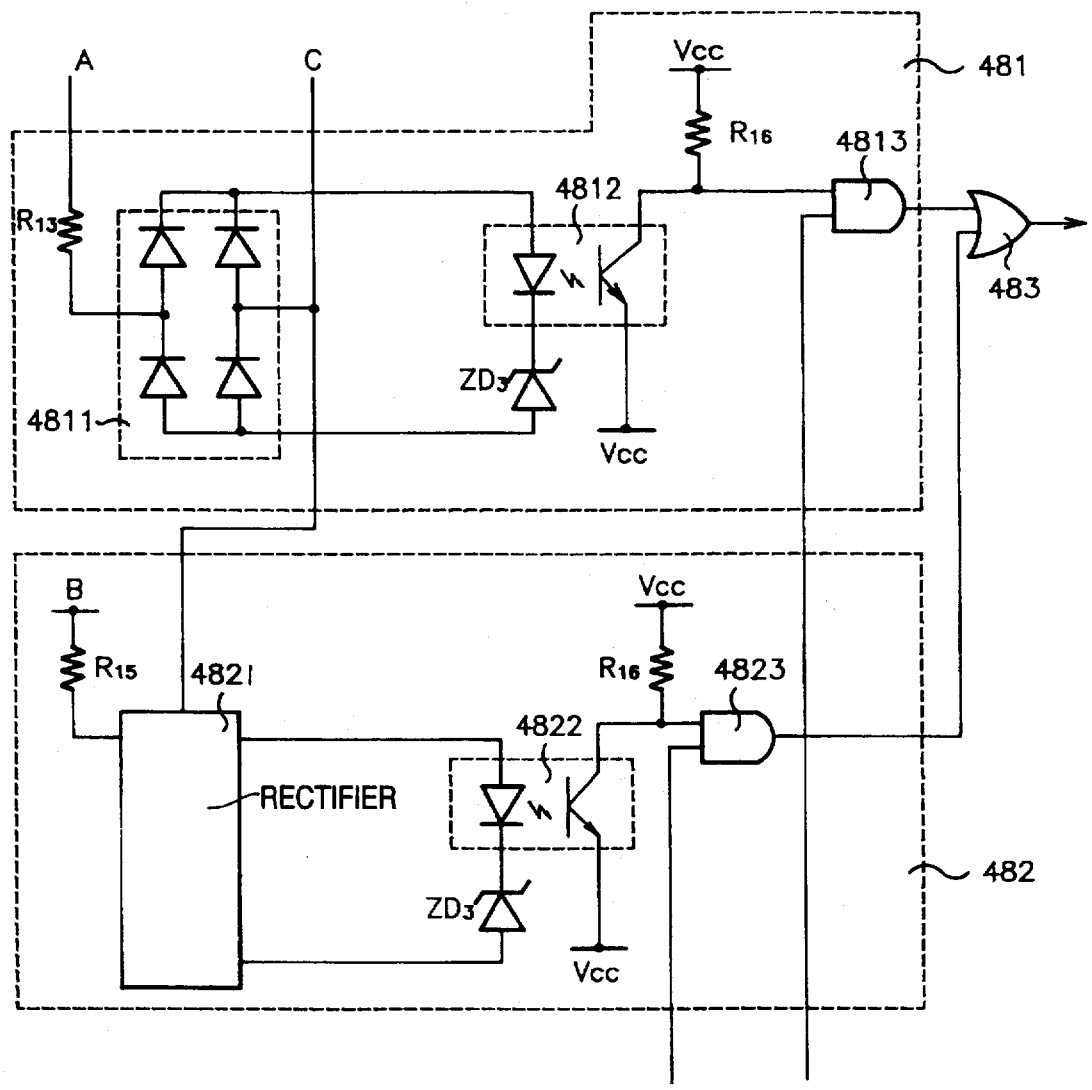
FIG. 15 is detailed circuit diagram of the phase angle detection part of FIG. 14.

As shown in FIG. 15, the phase angle detection part 480 includes a first phase angle detector 481 for detecting phase angle of the alternate current fed from the motor driving part 430 in response to the order signal for normal rotation received from the microcomputer 400. A second phase angle detector 482 detects phase angle of the alternate current fed from the motor driving part 430 in response to the order signal for reverse rotation received from the microcomputer 400. An OR gate 483 logically sums the signals received from the first and the second phase angle detectors 481 and 482 and applies the logic sum to the triangular wave generation part 460.

The first phase angle detector 481 includes a rectifier 4811 having bridge diodes for rectifying the alternate current fed from the motor driving part 430 to the washing machine motor 340, a photocoupler 4812 made conductive in response to the rectified current received from the rectifier 4811, and an AND gate 4813 for logic multiplying the signal received from the photocoupler 4812 and the order signal for normal rotation received from the microcomputer 400. The output of the AND gate 4813 is applied to the OR gate 483.

The second phase angle detector 482 includes a rectifier 4822 having bridge diodes for rectifying the alternate current fed from the motor driving part 430 to the washing machine motor 340, a photocoupler 4822 made conductive in response to the rectified current received from the rectifier 4821, and an AND gate 4823 for logic multiplying the signal received from the photocoupler 4822 and the order signal for normal rotation received from the microcomputer 400. The output of the AND gate 4823 is applied to the OR gate 483.

Operation of the foregoing device for controlling speed of a washing machine motor in accordance with the second embodiment of this invention is to be explained hereinafter.

The order signal for controlling speed of the washing machine motor 440 received from the microcomputer 400 is converted into a digital signal at the D/A conversion part 410 and applied to the proportional integration part 471. And the speed of the washing machine motor 440 sensed at the speed sensing part 450 is converted into a frequency signal which is converted again into voltage at the frequency/voltage conversion part 472, and then applied to the proportional integrator 471.

The proportional integrator 471 proportionally integrates signals received from both the frequency/voltage conversion part 472 and the D/A conversion part 410 to derive an error signal corresponding to error.

The phase angle detection part 480 detects phase angle using the alternate current fed from the motor driving part 430 to the washing machine motor 440 and the order signal for controlling the direction of rotation of the washing machine motor 440 received from the microcomputer 400. The triangular wave generation part 460 generates triangular pulses according to the phase angle received from the phase angle detection part 480.

Error signal applied from the proportional integration part 471 to the comparing part 420 is compared with triangular pulses generated in the triangular wave generation part 460. The output of comparing part 420 is applied to the motor driving part 430, and the motor driving part 430 drives the washing machine motor 440 rotating in normal and reverse direction in response to the signal received from the comparing part 420.

The washing machine motor can be driven at a desired speed. That is, because the signal from the comparing part 420 is a signal for controlling the timing of power feed (as the result of comparison of the error between the order speed signal of the microcomputer 400 and the actual speed of the washing machine motor 440 with the triangular pulse corresponding to the phase angle of the power fed to the washing machine motor 440), causing the motor driving part 430 to feed power to the washing machine motor 440 by controlling phase power.

Speed of the washing machine motor 440 is detected and converted into a frequency signal proportional to the number of revolutions by the speed sensing part 450, and fed to the microcomputer 400.

The microcomputer 400 compares the fedback frequency signal corresponding to the speed of the washing machine motor 440 with a preset order speed. It further applies a speed order signal corresponding to the difference of the compared speed to the D/A conversion part 410 to control the operation of the washing machine motor 440 at the preset order speed through the foregoing process.

A frequency applied from the speed sensing part 450 to the frequency/voltage conversion part 472 is converted to a voltage corresponding to the frequency, and applied to the proportional integration part 471 to generate a new error signal corresponding to the error.

The phase angle detection part 480 detects phase angle according to the alternate current fed from the motor driving part 430 to the washing machine motor 440 and the order signal for controlling the direction of rotation of the washing machine motor 440 received from the microcomputer 400, and applies the detected phase angle to the triangular wave generation part 460 to enable generation of triangular pulses according to the detected phase angle.

Comparing part 420 compares the new error signal received from the proportional integrator 471 with the triangular pulse received from the triangular wave generation part 460 to enable the motor driving part 430 to control the washing machine motor 450.

Figure 16:
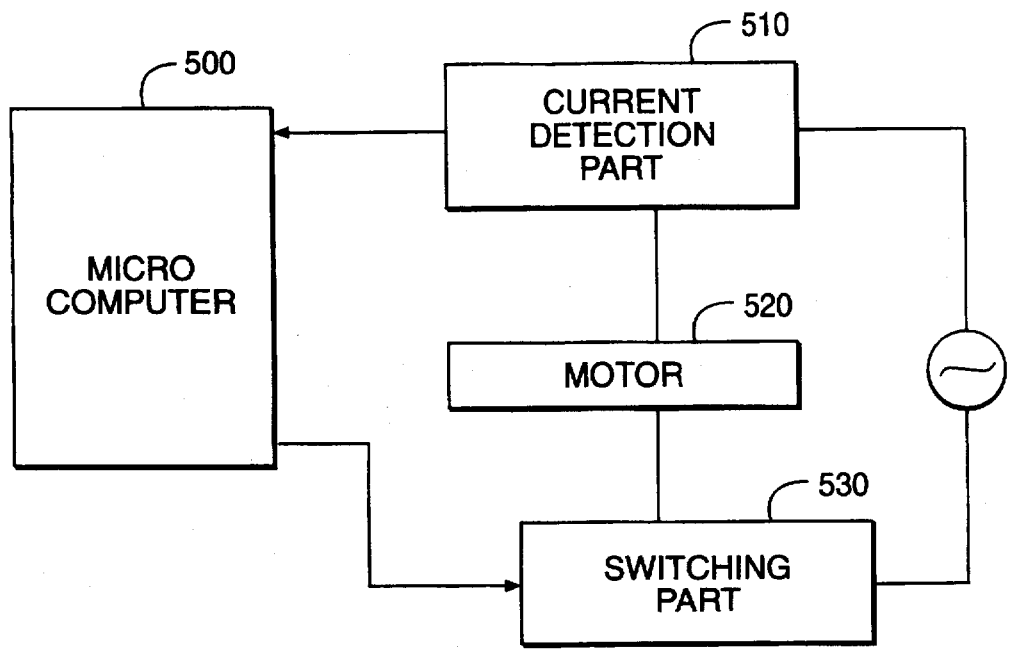
FIG. 16 is a schematic of a third device for controlling the speed of a washing machine motor, in which the present invention is embodied.
Figure 17:
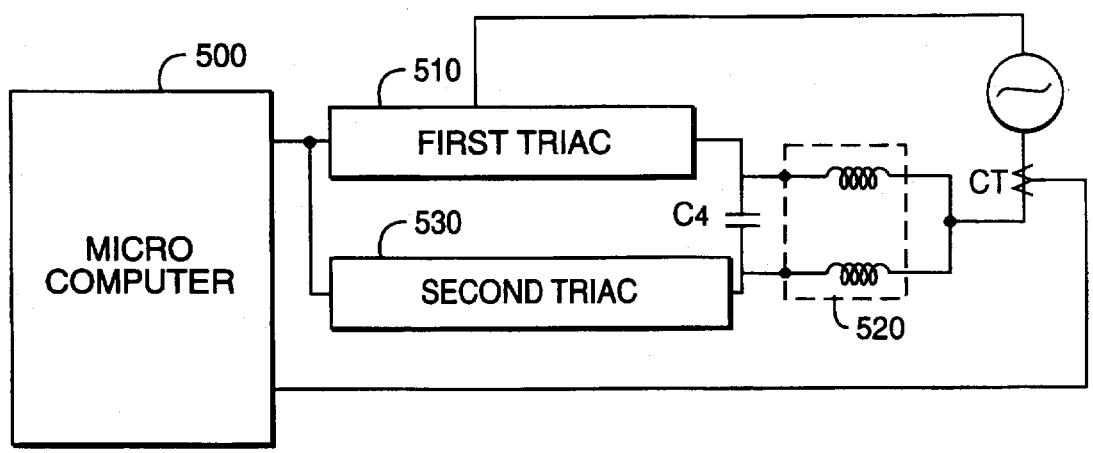
FIG. 17 is a detailed circuit diagram of FIG. 16.

As shown in FIGS. 16 and 17, a device for controlling speed of a washing machine motor in accordance with a third embodiment of this invention includes a microcomputer 500, a current detection part 510, and a switching part 530. The speed of the washing machine motor can be controlled by determining an amount of load from a speed-torque characteristic curve of the washing machine motor and estimating the speed of the washing machine motor by referring to data on driving speed of the washing machine motor generated in the microcomputer.

The current detection part 510 has a transformer CT connected to an alternate current input terminal of the washing machine motor 520 for sensing intensity of current flowing into the washing machine motor 520.

The microcomputer 500 determines the driving speed of the washing machine motor 520, by detecting laundry quantity from a speed-torque characteristic curve of the washing machine motor 520 based on the intensity of current received from the current detection part 510; controls operation of the washing machine motor 520; and stores data on amount of load and driving speed of the washing machine motor 520 generated in the microcomputer 500.

As shown in FIG. 17, the switching part 530 has a first and a second triacs 510 and 530 for controlling operation of the washing machine motor by turning on/off in response to the signal received from the microcomputer 500.

Figure 18:
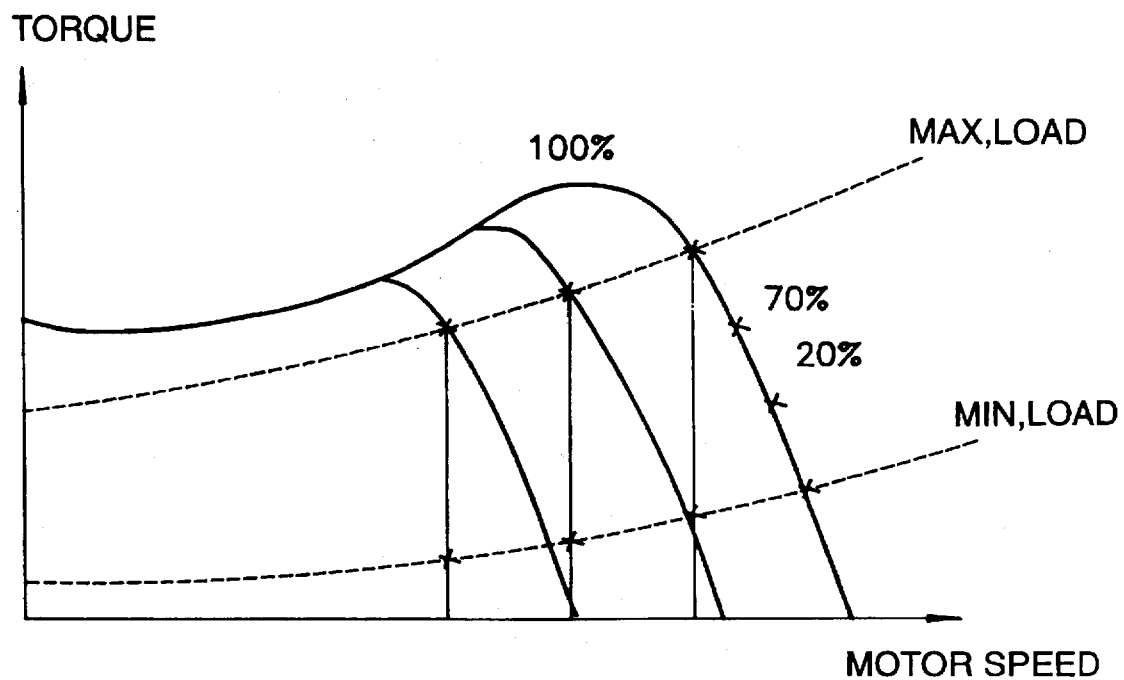
FIG. 18 is a graph illustrating the speed-torque characteristic of the washing machine motor shown in FIG. 16.

Operation of the device for controlling speed of the washing machine motor having the foregoing composition in accordance with this invention is to be explained hereinafter, referring to FIG. 18.

Since the maximum capacity of a washing machine will be fixed at least by the time of shipment, if intensity of current has been calculated based on amount of load at the maximum capacity as well as various working condition, the present speed of the washing machine motor can be determined.

In other words, at the time of shipment of the products, if speed-torque curves of a motor based on various loads have been prepared and the outermost contours for various loads are connected, these outermost contours represent the very curves when the maximum voltage is applied to washing machine motor 520. Accordingly, since load curves of 10% to 100% of the load of a washing machine can be obtained from the speed-torque characteristic curves, current intensities corresponding to these loads can be obtained. Therefore, by sensing loads at initial operation of the washing machine and based on the load curve about the loads, a phase angle, i.e., a speed of the washing machine motor can be determined.

That is, if a load based on a laundry quantity is 10% of the maximum load, by comparing a required intensity of current at the present speed taken along the 10% load curve of the speed-torque characteristic curve with the present intensity of current applied from the current sensing part 510, it is possible to determine the present required speed of the washing machine motor 520 to control the speed of the washing machine motor 520.

In other words, by sensing laundry quantity using the microcomputer 500 and detecting a load about the sensed laundry quantity, speed of the washing machine motor 520 can be determined.

And in the foregoing process, when the speed of the washing machine motor 520 is determined, the transformer CT in the current detection part 510 can detect the intensity of current flowing through the washing machine motor 520 which current intensity is applied to the microcomputer 500 by an A/D conversion input terminal thereon to determine the present speed of the washing machine motor 520 through compensation for error with proportional integration control and comparison with data already stored therein.

That is, speed of the washing machine motor 520 can be controlled without any separate additional device for detecting speed of the washing machine motor 520. This is achieved by comparing the speed of the washing machine motor 520, based on laundry quantity, with the speed of the washing machine motor 520 at the present time and controlling the first and the second triacs 531 and 532 in the switching part 530 based on the comparison of the speeds.

Figure 19:
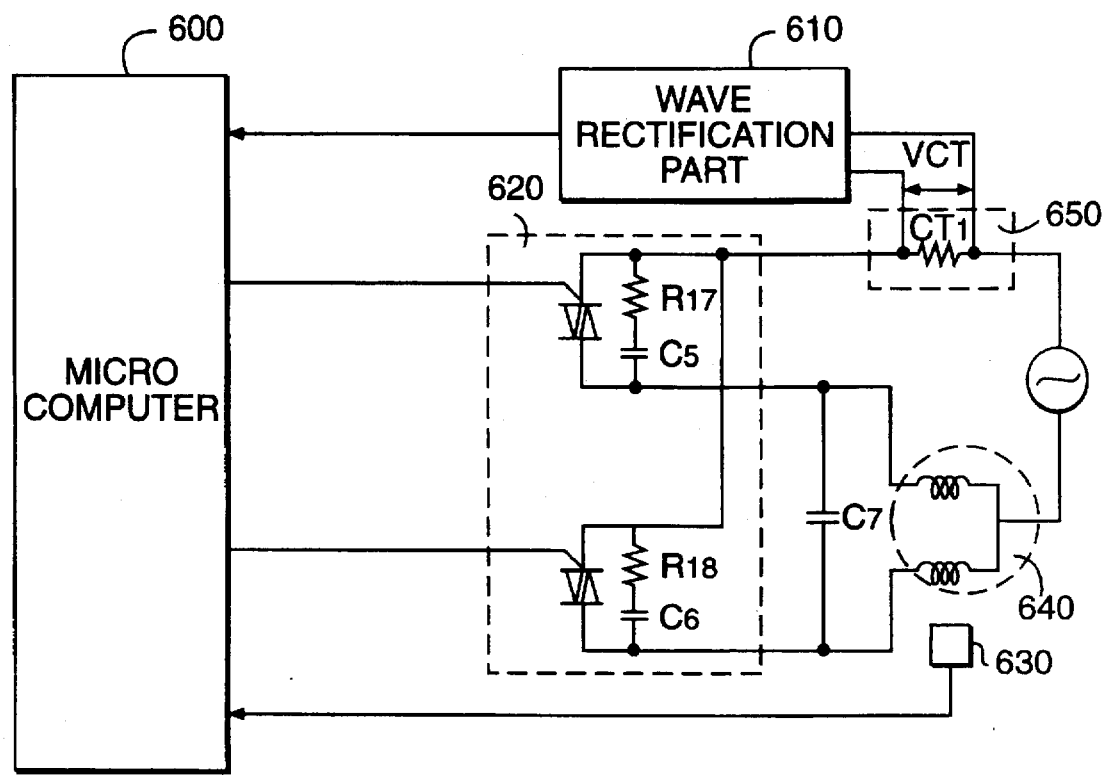
FIG. 19 is a schematic of a fourth device for controlling the speed of a washing machine motor, in which the present invention is embodied.

As shown in FIG. 19, a device for controlling speed of a washing machine motor in accordance with a fourth embodiment of this invention includes a microcomputer 600, a wave rectification part 610, an input power control part 620, and a speed detection part 630 and a current detection part 650. This device can maintain the washing machine motor at a constant speed by compensating for the variation of speed following input power change when the speed is changed through phase control.

The speed detection part 630 detects the speed of the washing machine motor 640, and the current detection part 650 detects the intensity of the current flowing through the washing machine motor 640.

Figure 20:
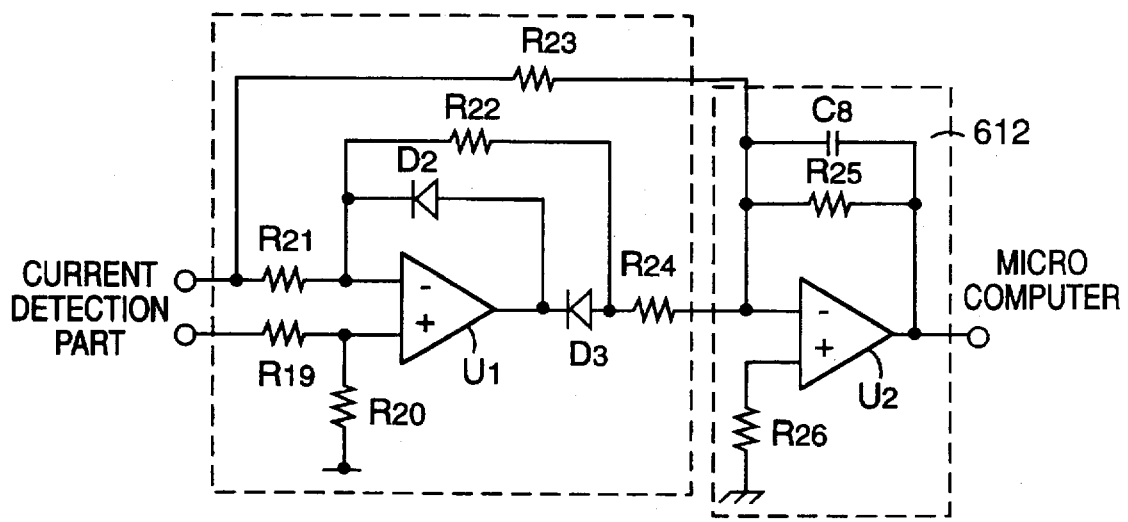
FIG. 20 is detailed circuit diagram of the wave rectification part of FIG. 19.

As shown in FIG. 20, the wave rectification part 610 includes a first amplification part 611 for receiving signals from the current detection part 650 as inverted and non-inverted inputs respectively, and a second amplification part 612 for receiving a signal from the first amplification part 611 as an inverted input. The wave rectification part 610 rectifies the current received from the current detection part 650 into direct current.

The first amplification part 611 includes a differential amplifier U1 having a (−) input terminal for receiving one signal from the current detection part 650 through a resistor R21 and a (+) input terminal for receiving another signal from the current detection part 650 through a resistor R19, which is connected in parallel to a resistor R20 having one end grounded. A diode D13 has a cathode connected to an output terminal of the differential amplifier U1 and an anode connected to the (−) input terminal of the differential amplifier U1 through a resistor R22. A resistor R24 is connected to the anode of the diode D3, a resistor R23 has its ends connected to the resistor R24 and the resistor R21, respectively. A diode D2 has an anode connected to the output terminal of the differential amplifier U1 and a cathode connected to the (−) input terminal of the differential amplifier U1.

The second amplifier 612 includes a resistor R26 having one end grounded, a differential amplifier U2 having a (+) input terminal connected to the other end of the resistor R26 and a (−) input terminal connected to the resistor R24 of the first amplification part 611, and a resistor R25 and capacitor C8 having ends connected to the output terminal and the (−) input terminal of the differential amplifier U2, respectively.

The microcomputer 600 controls the speed of the washing machine motor 640 in response to the signal received from the speed detection part 630 and the direct current received from the wave rectification part 610. The input power control part 620 controls input power to the washing machine motor 640 under the control of the microcomputer 600.

Operation of the device for controlling speed of a washing machine motor having the foregoing composition in accordance with the fourth embodiment of this invention is to be explained hereinafter, referring to FIGS. 21(a) to 21(c), 22, and 23(a) and 23(b).

Figure 21A:
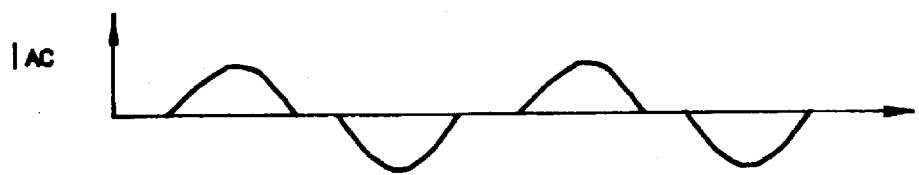
FIGS. 21(a), 21(b) and 21(c) are graphs showing signal wave patterns at various parts shown in FIG. 19.
Figure 21B:
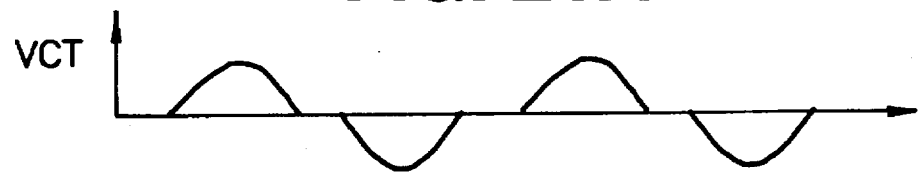
Figure 21C:
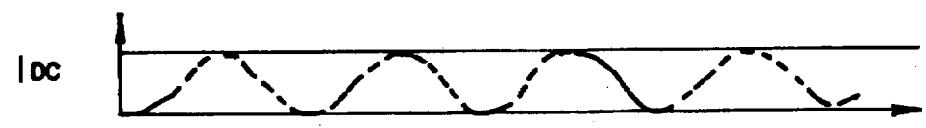

When current flows through both ends of the current detection part 650 as shown in FIG. 21(a), the wave pattern is converted into voltage at the current detection part 650 is as shown in FIG. 21(b). This voltage signal is applied to the wave rectification part 610 to rectify the signal into direct current voltage. If the signal received from the current detection part 650 is (−), the diode D2 is operated, and if the signal received from the current detection part 650 is (+), the diode D3 is operated. As a result, the wave rectification part 610 generates a smooth wave pattern as shown in FIG. 21(c).

Figure 22:
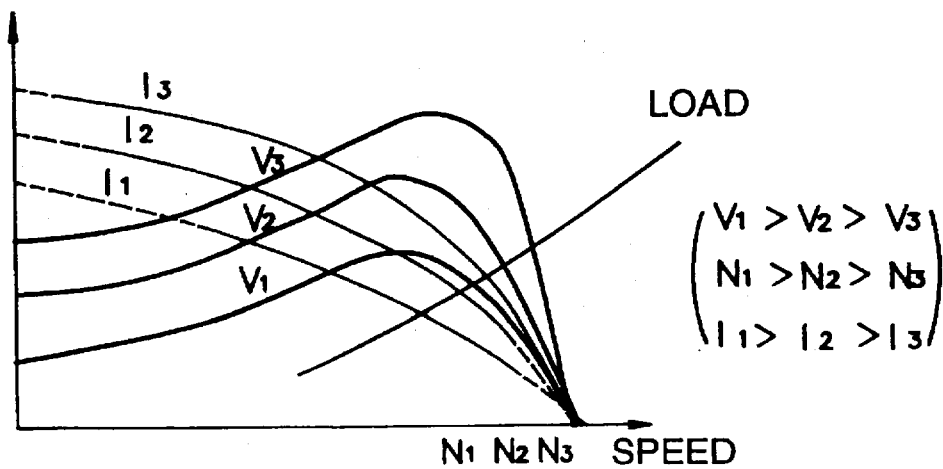
FIG. 22 is a graph illustrating the speed-torque characteristic of the washing machine motor shown in FIG. 19.
Figure 23A:
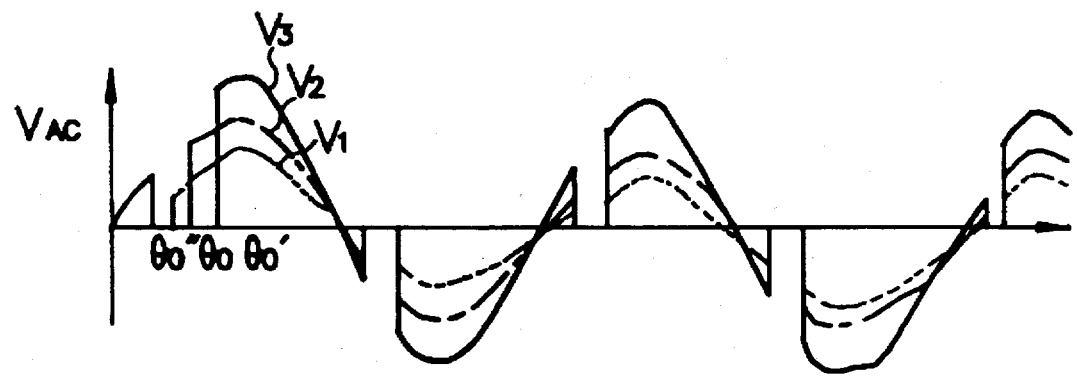
FIGS. 23(a) and 23(b) are graphs showing signal wave patterns of voltage and current of the washing machine motor of FIG. 19.
Figure 23B:
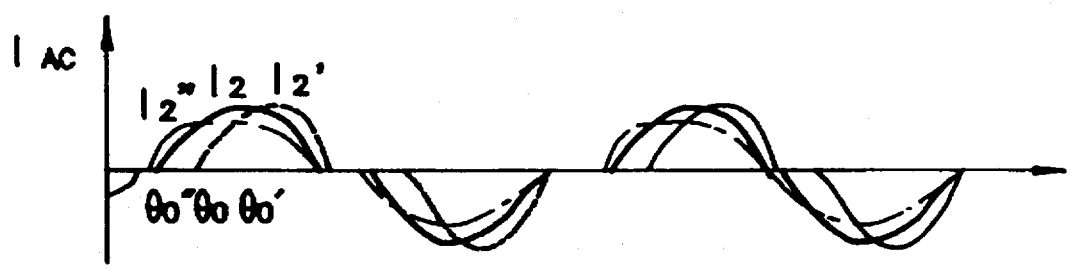

If the washing machine motor exhibits a load curve as shown in FIG. 22, when the input voltage would be changed from V3 to V2, the speed also would be changed from N2 to N3. Such a change of speed according to the change of voltage, which is a utilization of a characteristic of current change from current I2 to current I3 in the characteristic curves of the washing machine motor 640, can be achieved by the microcomputer 600 calculating the phase angle θ based on the increment of change of the current detected at the microcomputer 600 through the current rectification part 610. According to this, the washing machine motor 640 can be maintained at a constant speed, and come to have voltage and current patterns as shown in FIGS. 23(a) and 23(b), respectively.

As has been explained, this invention has advantages of facilitating convenient control of water current of a washing machine by controlling the direction of rotation and the number of revolutions of a washing machine motor by controlling the phase of input voltage applied to the washing machine motor, and improving quality and reliability of motors used in home electric appliances through precise speed control of the motors by applying this invention to refrigerators and air conditioners as well.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A method for controlling speed of a washing machine motor, comprising the steps of:
   determining an order speed of the washing machine motor based on a quantity of laundry;
   driving the washing machine motor at the determined order speed;
   detecting an actual speed of the wishing machine motor at every half cycle of ordinary use power frequency;
   determining a speed error by comparing the detected actual speed with determined order speed;
   determining a speed state using the determined speed error, the speed state determining step including the steps of
      determining the speed state to be overspeed if the speed error is greater than a preset allowance,
      determining the speed state to be underspeed if the speed error is smaller than the allowance, and
      determining the speed state to be normal if the speed error is within the allowance;
   calculating a proportional integration compensation value according to the determined speed state, the proportional integration compensation value calculation step including
      an underspeed proportional integration compensation value calculation step for calculating an underspeed proportional integration compensation value if underspeed is a result of the speed state determination step, and
      an overspeed proportional integration compensation value calculation step for calculating an overspeed proportional integration compensation value if overspeed is a result of the speed state determination step;
   determining an occupancy angle based on the calculated proportional integration compensation value; and
   controlling the speed of the washing machine motor using the occupancy angle.

2. The method as claimed in claim 1, wherein the actual speed detection step includes:
   receiving interrupts corresponding to every half cycle of the ordinary use power frequency;
   detecting falling edges of rectangular pulses corresponding to a rotation of the washing machine motor;
   detecting one cycle of the rectangular pulses by detecting a period of time taken from the detected falling edge to a next falling edge; and
   scaling actual speed of the washing machine motor from the detected cycle of rectangular pulses.

3. The method as claimed in claim 2, wherein the interrupt periodically generates at every 8.3 ms.

4. The method as claimed in claim 1, wherein the underspeed proportional integration compensation value calculation step includes:
   calculating a proportional compensation value Wp by multiplying a proportional gain constant Kp and the determined speed error We;
   calculating an integration compensation value Wi by multiplying an integration gain constant Ki, a loop time T, and the speed error We and adding the above multiplied value to an initial integration value Wi; and
   calculating a proportional integration compensation value Wpi by adding the calculated proportional compensation value Wp to the calculated integration compensation value Wi.

5. The method as claimed in claim 1, wherein the overspeed proportional integration compensation value calculation step includes:
   calculating a proportional compensation value Wp by multiplying a proportional gain constant Kp and the determined speed error We;
   calculating an integration compensation value Wi by multiplying an integration gain constant Ki, a loop time T, and the speed error We and adding the above multiplied value to an initial integration value Wi; and
   calculating a proportional integration compensation value Wpi by adding the calculated proportional compensation value Wp to the calculated integration compensation value Wi.

6. The method as claimed in claim 1, wherein the occupancy angle determining step includes:
   an underspeed occupancy angle calculation step for scaling the underspeed proportional integration compensation value into an occupancy angle after carrying out the underspeed proportional integration compensation value calculation step; and
   an overspeed occupancy angle calculation step for scaling the calculated overspeed proportional integration compensation value into an occupancy angle after carrying out the overspeed proportional integration compensation value calculation step.

7. The method as claimed in claim 6, wherein the underspeed occupancy angle calculation step includes:
   scaling the actual speed Wrm* into a first angular value $\alpha$ by multiplying the actual speed Wrm* and $\pi/1800$;
   scaling the underspeed proportional integration compensation value Wpi into a second angular value $\Delta W$ by multiplying the underspeed proportional integration compensation value Wpi and $\pi/1800$; and
   calculating an underspeed occupancy angle $\alpha'$ by subtracting the second angular value $\Delta W$ from the first angular value $\alpha$.

8. The method as claimed in claim 6, wherein the overspeed occupancy angle calculation step includes:
   scaling the actual speed Wrm*, into a first angular value $\alpha$ by multiplying the actual speed Wrm*, and $\pi/1800$;
   scaling the overspeed proportional integration compensation value Wpi into a second angular value $\Delta W$ by multiplying the overspeed proportional integration compensation value Wpi and $\pi/1800$; and
   calculating an overspeed occupancy angle $\alpha''$ by adding the first angular value $\alpha$ and the second angular value $\Delta W$.

9. The method as claimed in claim 7, wherein, if the underspeed occupancy angle $\alpha'$ is smaller than 0 or greater than $\pi$, it is determined that the speed is normal.

10. The method as claimed in claim 8, wherein, if the overspeed occupancy angle $\alpha''$ is smaller than 0 or greater than $\pi$, it is determined that the speed is normal.

11. An apparatus for controlling speed of a washing machine motor, comprising:
    current detection means for detecting a current intensity of the washing machine motor;
    speed detection means for detecting a number of rotations of the washing machine motor;
    a microcomputer including means for determining an amount of load from the detected current intensity, means for determining an initial order speed by applying a phase angle pattern based on the determined amount of load, means for determining a speed of the washing machine motor based on the number of rotations from the speed detection means, means for determining an occupancy angle by comparing the determined speed with the determined initial order speed, and means for generating order signals to control rotation speed, rotation direction, and stoppage of the washing machine motor based on the number of rotations of the washing machine motor;

digital/analog conversion means for converting the speed order signal from the microcomputer into an analog signal;

triangular wave generation means for generating triangular pulses from a zero crossing point of an indirect voltage from a power source;

comparing means for generating trigger pulses by comparing the analog signal from the digital/analog conversion means with the triangular pulses from the triangular wave generation means;

motor driving means for supplying an indirect current power source to the washing machine motor to drive the washing machine motor using the trigger pulses from the comparing means and the rotation direction and stoppage order signals from the microcomputer; and phase angle detection means for detecting phase angle using the indirect current supplied by the motor driving means and the rotation direction order signal from the microcomputer, and applying the detecting phase angle to the triangular wave generation means to generate the triangular pulses according to the detected phase angle.

12. The apparatus as claimed in claim 11, further including synchronization circuit means for generating synchronizing signals synchronized to the zero crossing point of the indirect voltage and applying the synchronizing signals to the triangular wave generation means.

13. The apparatus as claimed in claim 12, wherein the synchronization circuit means includes:

rectification means for rectifying the indirect voltage applied thereto;

clamping means for clamping the rectified voltage received from the rectification means;

a photocoupler for separating the signal received from the clamping means into alternate current and control signal and inverting the separated control signal;

a NOT gate for inverting the control signal received from the photocoupler;

delay means for delaying the control signal received from the NOT gate; and a NAND gate for performing a NAND operation on the inverted and delayed control signals received from the NOT gate and the delay means, respectively.

14. The apparatus as claimed in claim 12, wherein the triangular wave generation means includes:

a capacitor for generating the triangular pulses by charging and discharging;

discharge means for discharging the capacitor in response to the synchronization signals received from the synchronization circuit means; and charge means for charging the capacitor depending on the voltage from the power source.

15. The apparatus as claimed in claim 11, wherein the motor driving means includes:

a phase controller for controlling a phase of the indirect current of the washing machine motor; and a phase controller driver for driving and controlling the phase controller in response to the rotation direction and stoppage order signals from the microcomputer and trigger pulses from the comparing means.

16. The apparatus as claimed in claim 15, wherein the phase controller driver includes: a first AND gate for logic multiplying the trigger pulses from the comparing means and a reverse rotation order signal from the microcomputer to generate a reverse rotation signal for the phase controller;

a second AND gate for logic multiplying the trigger pulses from the comparing means and a normal rotation order signal from the microcomputer to generate a normal rotation signal for the phase controller;

a third AND gate for logic multiplying the reverse rotation order signal and the normal rotation order signal from the microcomputer; and a NOR gate for performing a NOR operation on the stop order signal from the microcomputer and an output of the third AND gate to generate an enable signal for controlling operation of the first and the second AND gates.

17. The apparatus as claimed in claim 16, wherein the phase controller includes:

a first photocoupler for separating the reverse rotation order signal into a first alternate current and a first control signal and transmitting the first alternate current and the first control signal;

a second photocoupler for separating the normal rotation signal into a second alternate current and a second control signal and transmitting the second alternate current and the second control signal;

a first triac for applying the first alternate current to the washing machine motor in response to the first control signal received from the second photocoupler; and a second triac for applying the second alternate current to the washing machine motor in response to the second control signal received from the second photocoupler.

18. The apparatus as claimed in claim 11, wherein the phase angle detection means includes:

a first phase angle detector for detecting phase angle of the indirect current from the motor driving means in response to the rotation direction order signal for normal rotation from the microcomputer;

a second phase angle detector for detecting phase angle of the indirect current from the motor driving means in response to the rotation direction order signal for reverse rotation from the microcomputer; and an OR gate for logical summation of outputs of the first and the second phase angle detectors and applying the logic sum to the triangular wave generation means.

19. The apparatus as claimed in claim 18, wherein the first phase angle detector includes:

a rectifier for rectifying the indirect current from the motor driving means;

a photocoupler conductive in responsive to the rectified current from the rectifier; and an AND gate for logic multiplying an output of the photocoupler and the rotation direction order signal for normal rotation from the microcomputer, and applying the logic multiplied signal to the OR gate.

20. The apparatus as claimed in claim 18, wherein the second phase angle detector includes:

a rectifier for rectifying the indirect current from the motor driving means;

a photocoupler conductive in response to the rectified current from the rectifier; and an AND gate for logic multiplying an output of the photocoupler and the rotation direction order signal for normal rotation from the microcomputer, and applying the logic multiplied signal to the OR gate.

21. The apparatus as claimed in claim 19, wherein the rectifier includes bridge diodes.

22. The apparatus as claimed in claim 20, wherein the rectifier includes bridge diodes.

23. The apparatus as claimed in claim 11, further including proportional integration means for applying speed error signals, calculated through proportional integration based on the number of rotations of the washing machine motor from the speed detection means and the analog signal from the digital/analog conversion means, to the comparing means.

24. The apparatus as claimed in claim 23, wherein the speed detection means includes hole sensors.

25. The apparatus as claimed in claim 24, wherein the proportional integration means includes:
- a frequency/voltage converter for converting the number of rotations of the washing machine motor from the speed detection means into voltage; and
- a proportional integrator for proportional integration of an output of the frequency/voltage converter and the analog signal from the digital/analog conversion means to generate the speed error signal.

* * * * *

UNITED STATES PATENT AND TRADEMARK OFFICE
CERTIFICATE OF CORRECTION

PATENT NO. : 5,682,634
DATED : November 04, 1997
INVENTOR(S) : Dal Ho CHEONG et al.

It is certified that error appears in the above-indentified patent and that said Letters Patent is hereby corrected as shown below:

Claim 1, column 15, line 10, "wishing" should read --washing--.

Claim 1, column 15, line 13, before "determined", insert --the--.

Claim 8, column 16, line 43, after "Wrm*", delete ",".

Claim 8, column 16, line 44, after "Wrm*", delete ",".

Signed and Sealed this

Fourth Day of August, 1998

*Attest:*

*Attesting Officer*

BRUCE LEHMAN
*Commissioner of Patents and Trademarks*